(12) United States Patent
Lauer et al.

(10) Patent No.: US 11,038,805 B2
(45) Date of Patent: *Jun. 15, 2021

(54) USER DIRECTED BANDWIDTH OPTIMIZATION

(71) Applicant: GOGO BUSINESS AVIATION LLC, Broomfield, CO (US)

(72) Inventors: Bryan Adrian Lauer, Chicago, IL (US); Patrick J. Walsh, Naperville, IL (US); Sara B. Rossio, Chicago, IL (US); Rachel Morris, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,965

(22) Filed: Nov. 25, 2019

(65) Prior Publication Data

US 2020/0092216 A1 Mar. 19, 2020

Related U.S. Application Data

(63) Continuation of application No. 15/263,921, filed on Sep. 13, 2016, now Pat. No. 10,491,531.

(51) Int. Cl.
*H04L 12/863* (2013.01)
(52) U.S. Cl.
CPC .................................. *H04L 47/50* (2013.01)
(58) Field of Classification Search
CPC . H04L 41/0896; H04L 43/0876; H04L 41/22; H04L 47/50; H04L 47/00; H04L 47/52
See application file for complete search history.

(56) References Cited

U.S. PATENT DOCUMENTS 5,898,839 A 4/1999 Berteau
6,754,699 B2 6/2004 Swildens et al.
(Continued)

FOREIGN PATENT DOCUMENTS

CA 2447698 A1 11/2002
CN 1529960 A 9/2004
(Continued)

OTHER PUBLICATIONS

Verizon FamilyBase and Usage Controls, Retrieved from the Internet at : <https://www.verizonwireless.com/support/usage-controls-legal/> (2016).

(Continued)

*Primary Examiner* — Austin J Moreau
(74) *Attorney, Agent, or Firm* — Marshall, Gerstein & Borun LLP; Randall G. Rueth

(57) ABSTRACT

Systems and methods are provided to optimize bandwidth usage associated with a local network. As part of the bandwidth optimization techniques, an authentication entity may receive an indication of an access profile selected by a user of an electronic device. The authentication entity may assign the access profile to the electronic device. Accordingly, when the electronic device transmits data, a network regulation entity may process the traffic in accordance with the access profile. To this end, the network regulation entity may correspond communication sessions within the traffic to an application. The network regulation entity may then query the access profile to determine a priority for each application. When the traffic exceeds a threshold byte volume, the network regulation entity may queue lower priority communication sessions. By processing the traffic based upon a user-indicated access profile, compliance with network neutrality principles may be maintained.

20 Claims, 11 Drawing Sheets

(56) References Cited

U.S. PATENT DOCUMENTS

| | | |
|---|---|---|
| 6,975,594 B1 | 12/2005 | Byers |
| 7,406,532 B2 | 7/2008 | Kryskow, Jr. et al. |
| 7,406,707 B2 | 7/2008 | Venkatachary et al. |
| 7,433,943 B1 | 10/2008 | Ford |
| 7,483,982 B2 | 1/2009 | Hegli et al. |
| 7,801,992 B2 | 9/2010 | Gibbons et al. |
| 7,904,554 B1 | 3/2011 | Lu et al. |
| 7,979,880 B2 | 7/2011 | Hosea et al. |
| 8,266,266 B2 | 9/2012 | Short et al. |
| 8,352,868 B2 | 1/2013 | Betts-LaCroix et al. |
| 8,355,337 B2 | 1/2013 | Raleigh |
| 8,572,666 B2 | 10/2013 | Bugenhagen |
| 8,589,541 B2 | 11/2013 | Raleigh et al. |
| 8,601,084 B2 | 12/2013 | Carlander |
| 8,675,507 B2 | 3/2014 | Raleigh |
| 9,014,026 B2 | 4/2015 | Raleigh |
| 9,137,739 B2 | 9/2015 | Raleigh |
| 10,491,531 B2 | 11/2019 | Lauer et al. |
| 2005/0246282 A1 | 11/2005 | Naslund et al. |
| 2009/0180430 A1* | 7/2009 | Fadell ............... H04L 47/10 370/329 |
| 2013/0028128 A1 | 1/2013 | Novak et al. |
| 2014/0057592 A1 | 2/2014 | Chetlur et al. |
| 2014/0317280 A1 | 10/2014 | Ke |
| 2015/0098390 A1* | 4/2015 | Efrati ............... H04W 72/02 370/329 |
| 2015/0207708 A1 | 7/2015 | Raleigh et al. |
| 2015/0256545 A1 | 9/2015 | Dotterer, III et al. |
| 2017/0214744 A1 | 7/2017 | Neves et al. |
| 2017/0222820 A1 | 8/2017 | Backholm et al. |

FOREIGN PATENT DOCUMENTS

| | | |
|---|---|---|
| CN | 102546297 A | 7/2012 |
| EP | 1388233 A1 | 2/2004 |
| EP | 2787695 A1 | 10/2014 |
| WO | WO-01/015053 A2 | 3/2001 |
| WO | WO-01/080504 A1 | 10/2001 |
| WO | WO-01/098956 A1 | 12/2001 |

OTHER PUBLICATIONS

Verizon FamilyBase and Usage Controls, Retrieved from the Internet at: <https://www.verizonwireless.com/support/verizon-familybase-and-usage-controls/usage-controls/> (2016).

* cited by examiner

USER DIRECTED BANDWIDTH OPTIMIZATION

CROSS-REFERENCE TO RELATED APPLICATIONS

The present application is a continuation of U.S. patent application Ser. No. 15/263,921, filed Sep. 13, 2016, and entitled "User-Directed Bandwidth Optimization." Additionally, the present application is related to U.S. application Ser. Nos. 15/264,066 and 15/264,193 filed Sep. 13, 2016. The entire disclosures of each of which are incorporated herein by reference.

TECHNICAL FIELD

The following disclosure relates to systems and methods for optimizing bandwidth allocations within a network, and more particularly, for optimizing the bandwidth allocations for electronic devices as directed by users thereof.

BACKGROUND

Many network are faced with capacity constraints. For some of these networks, capacity constraints may cause a network operator to impose limits on users of the network. As an example, a network operator may implement a rate limit (a maximum achievable bit rate) or a consumption cap (a limit on the number of bytes for a period of time). Such network policies prevent individual users from utilizing a disproportionate share of the constrained capacity, ensuring that more users can enjoy a higher quality network performance.

However, due to network neutrality requirements, some network operators may be restricted in the types of limits they may impose on users when addressing capacity constraints. To this end, network neutrality may require that some network operators treat all data equally, regardless of the content or source. Thus, operators of constrained networks may not be able to implement particular types of limits or caps that are useful in allocating the limited network resources amongst its various users. Accordingly, there is a need to develop systems and methods of network regulation that are both effective at controlling individual bandwidth usage and still comply with network neutrality principles.

SUMMARY OF THE DISCLOSURE

In one embodiment, a method for optimizing bandwidth usage is provided. The method may comprise (1) receiving, from an electronic device, a plurality of data packets respectively addressed to a location external to a local network; (2) identifying, by one or more processors, a plurality of communication sessions supported by the plurality of data packets; (3) for each identified communication session, corresponding, by the one or more processors, the communication session to an application; (4) querying, by the one or more process, an access profile assigned to the electronic device to determine a priority level for each application corresponding to a communication session, wherein the access profile is assigned to the electronic device based upon an indication of a user selection received from the electronic device, and associated with a prioritized list of applications; (5) comparing, by the one or more processors, an amount of bandwidth required to transmit the plurality of data packets to a total bandwidth allocation indicated by the access profile. When the amount of bandwidth required to transmit the plurality of data packets is greater than a first threshold proportion of the total bandwidth allocation, the method may include (i) routing a plurality of data packets associated with a first priority level to the respective locations external to the local network, and (ii) queuing a plurality of data packets associated with a second priority level, the second priority level being a lower priority than the first priority level. When the amount of bandwidth required to transmit the plurality of data packets is less than the first threshold proportion of the total bandwidth allocation, the method may include routing the plurality of data packets associated with the first priority level and the plurality of data packets associated with the second priority level to the respective locations external to the local network.

In another embodiment, a method for optimizing bandwidth usage via an application executing on an electronic device is provided. The electronic device may include one or more processors, and a memory coupled to the one or more processors. The method may comprise (1) the application causing the one or more processors to present an interface in the application executing on the electronic device, the interface for selection of an access product, the access product corresponding to an access profile that identifies a prioritized set of applications; (2) receiving an input at the one or more processors, from the user via the application, indicating a selection of the access product; (3) the application causing the one or more processors to transmit, via a local network, a notification including an indication of the selected access product; and (4) the electronic device causing the one or more processors to transmit, via the local network, a plurality of data packets respectively addressed to locations external to a local network, each data packet being associated with an application, wherein when the byte volume of the plurality of data packets exceeds a threshold byte volume indicated by the access profile, data packets associated with applications that correspond to a higher priority level are transmitted to the respective locations external to the local network and applications data packets associated with applications that correspond to a lower priority level are queued.

In still another embodiment, a system for optimizing bandwidth usage is provided. The system may comprise (i) one or more processors; (ii) a profile database storing an access profile corresponding to an electronic device; and (iii) one or more non-transitory, computer-readable storage media storing computer-executable instructions. When the instructions are executed by the one or more processors, the instructions cause the system to (1) receive, from the electronic device, a traffic addressed to a location external to a local network; (2) identify, by the one or more processors, a plurality of data streams within the traffic; (3) respectively correspond, by the one or more processors, the plurality of data stream to a plurality of applications; (4) query, by the one or more process, the access profile corresponding to the electronic device to determine a priority level for the plurality of applications, wherein the access profile is assigned to the electronic device based upon an indication of a user selection received from the electronic device, and associated with a prioritized list of applications; (5) compare, by the one or more processors, an amount of bandwidth required to transmit the traffic to a total bandwidth allocation indicated by the access profile. When the amount of bandwidth required to transmit the traffic is greater than a threshold proportion of the total bandwidth allocation, the instructions may cause the system to route the data streams corresponding to applications associated with a first priority level to the respective locations external to the local network, and queue data streams corresponding to application associated with a second priority level, the second priority level being a lower priority than the first priority level. When the amount of bandwidth required to transmit the traffic is less than the threshold proportion of the total bandwidth allocation, the instructions may cause the system to route the data streams corresponding to applications associated with the first priority level and the data streams corresponding to application associated with the second priority level to the respective locations external to the local network.

DETAILED DESCRIPTION

Figure 1:
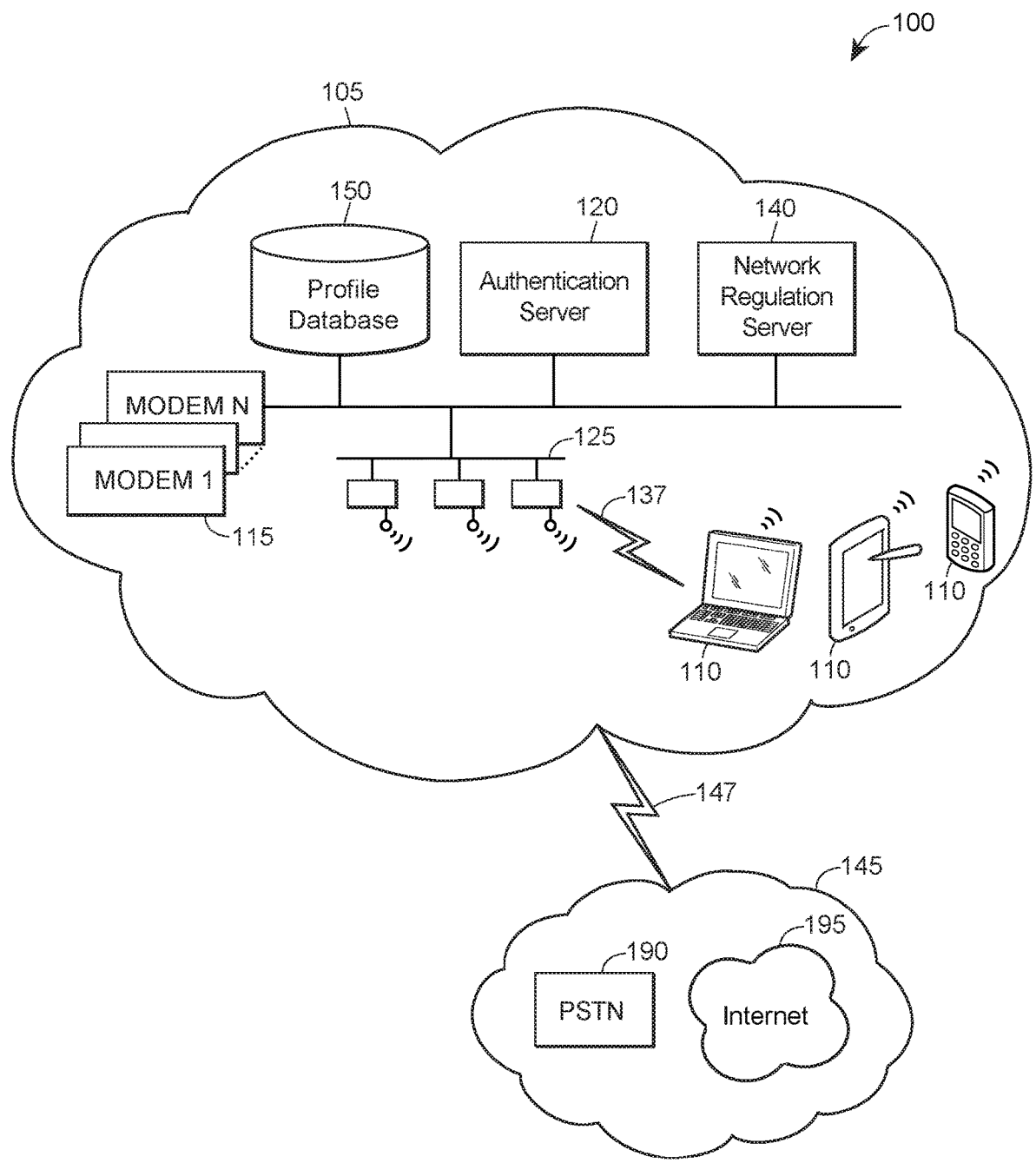
FIG. 1 depicts an embodiment of an exemplary communication system capable of performing one or more of the bandwidth optimization techniques disclosed herein.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Traditionally, when an electronic device attempts to register with a network, the electronic device exchanges communications with a network entity that controls access to that network (referred to generally herein as an "authentication server"). For example, some networks utilize an authentication, authorization, and accounting server (a "AAA"). Other networks may utilize a firewall server. Regardless of the specific type of server, the authentication server may ensure that the electronic device is authenticated to access and/or utilize the network. In some networks, the authentication server may be associated with a database of devices that have access to the network (e.g., a Home Location Register or HLR). In these networks, when the electronic device attempts to register with the network, the authentication server may query the database to determine whether the electronic device has access to the network.

After the electronic device is granted network access by the authentication server, the authentication server may associate the electronic device with an access profile. More particularly, the authentication server may update a profile database to create and/or update an access profile corresponding to the electronic device. In some embodiments, the profile database may be a component of or otherwise interconnected with an HLR. The access profile may indicate a set of parameters which control the network experience associated with the electronic device. For example, the access profile may indicate whether the electronic device is associated with a rate limit and/or whether the electronic device may utilize a particular application (e.g., a VPN application, a particular website, etc.) and/or an application category (i.e., a set of applications that share a common characteristic, such as, for example, a type of communication, a type of information transmitted by the application, an application provider, and so on). If the electronic device has not previously utilized the network, the authentication server may associate the electronic device with a default access profile. On the other hand, if the electronic device has previously utilized the network, then the access profile may be the same profile as previously associated with the electronic device. In some scenarios, an electronic device may correspond to a profile wherein particular parameters are adjusted for only a fixed amount of time and/or events (e.g., a higher bandwidth cap that expires after 24 hours and/or upon the completion a journey). In these scenarios, the parameters associated with the fixed amount of time and/or events may return to a default value upon the expiration thereof. It should be appreciated that some parameters within an access profile may survive the expiration of the fixed amount of time and/or events. For example, if a user indicates that access to a particular application should be blocked, the corresponding network parameter may be persistent until subsequently changed by the user.

According to some aspects, network operators may sell products associated with different tiers of access to their networks. For example, a network operator may enable a customer to purchase network access that enables the electronic device to be allocated more bandwidth and/or consume more data. As another example, a network operator may enable a customer to purchase access to specific applications and/or application categories that are restricted to other users (for example, a video conferencing application). Accordingly, when a user first interacts with a network, the user may be presented with an interface that enables the purchase of an access product. It should be appreciated that in some networks, the user may be presented with a selection of several free access products. Accordingly, as it is used herein, the term "purchase" includes the selection of a free access product.

In response to the user purchasing a particular access product, the authentication server may update the profile database to indicate that electronic device is associated with network access consistent with the terms of the purchased access product. For example, if the access product included a particular bandwidth cap, a bandwidth limit parameter within the access profile for the electronic device may be changed from a default or other previously stored value to one corresponding to the access product. As another example, if the access product included access to a particular application, the access profile for the electronic device may be changed to indicate that the electronic device has access to the particular application. As yet another example, if the access product is configured to prioritize a particular set of applications, the access parameters within the access profile for the electronic device may be modified to implement to corresponding priority preferences. It should be appreciated that some applications may require additional provisioning and/or registration for an electronic device to receive access to the application. For example, a SMS over Wi-Fi application may require that the electronic device is registered with a Short Messaging Service Center (SMSC). Accordingly, in addition to updating the access profile, the authentication server may also ensure that any required provisioning and/or registration occurs.

As described above, some networks may be associated with constrained capacity. For example, a network local to an aircraft or other vehicle may have limited bandwidth to communicate over an air-to-ground and/or satellite communications link. Similarly, a small or pico-cell network may have a limited capacity. Thus, it is not uncommon that the aggregate amount of data generated within these networks exceeds the network capacity constraints. To solve this problem, a network operator may include a network regulation server to control communications generated by and/or terminated at electronic devices within the network. To this end, all communications generated within the network may first be processed by the network regulation server prior to being routed over the constrained communication link. In particular, when the network regulation server receives communications generated by a particular electronic device, the network regulation server may query the corresponding access profile within the profile database to regulate the communications in accordance with the access profile.

In some embodiments, each service and/or application may be associated with a priority. In these embodiments, when communications to and from an electronic device approach the maximum bandwidth allocated to the electronic device (as indicated by the access profile), the network regulation server may prioritize communications that correspond to a higher priority. For example, the access profile corresponding to an electronic device may indicate that email is a higher priority than web browsing. Accordingly, when the electronic device approaches the maximum allocated bandwidth, the network regulation server may transmit the data packets associated with the email service; whereas data packets associated with web browsing may be scheduled to be transmitted when more bandwidth is available. In some embodiments, the network regulation server may regulate low priority data such that, despite being delayed or otherwise de-prioritized, communication session facilitated by the low priority data may still be maintained.

It should be appreciated that for some networks, all communications generated within the network may be aggregated and transmitted in a single aggregate stream and/or tunnel. In some embodiments, the data aggregation entity may be different than the network regulation entity. Thus, as it is used generally herein with respect to a network regulation entity transmitting and/or routing communications to a location external to the network, the term "transmit" and/or "route" includes the routing of a data packet to a data aggregator prior to transmission over an external communications link.

Additionally, the network regulation server may monitor usage statistics associated with each electronic device communicating over the network. To this end, a user of the electronic device may interact with a plurality of different applications (including websites) via the network. Accordingly, the network regulation server may record and/or aggregate usage statistics indicating an amount of data the electronic device communicated to and/or from each of these applications. The network regulation server may utilize the recorded and/or aggregated usage statistics to generate a usage profile within the profile database that corresponds to the electronic device.

According to aspects, the network regulation server may also cause a usage summary user interface to be displayed on the electronic device. To this end, the usage summary user interface may present the aggregated usage statistics and/or enable the user to change a network regulation activity associated with a particular application. Generally, to facilitate the presentation of a user interface on the electronic device, the network regulation server may generate a set of computer readable instructions that, when executed by the electronic device, cause the electronic device to present the user interface to the user of the electronic device. In some embodiments, the user interface may be presented as a web page presented in a browser application executing on the electronic device. In these embodiments, in response to the browser navigating to a particular address associated with the presentation of the usage profile, the network regulation server may transmit the computer readable instructions to the electronic device. Accordingly, the computer readable instructions may include an HTML resource, a JavaScript applet, a Cascading Style Sheets component, and/or other known software elements that support the presentation of user interfaces over a network. According to certain aspects, the computer readable instructions may utilize a software techniques (e.g., AJAX) that causes the network regulation server to dynamically update the user interface displayed on the web page in response to any changes to the usage statistics.

In other embodiments, the user interface may be presented within an application executing on the electronic device. In these embodiments, the computer readable instructions may include an instruction that causes an application stored on the electronic to launch. For example, the network operator may distribute an application for enabling users to manage their network experience and/or configuration via an app store or as a hosted download. In some scenarios, the app may already include instructions to display a template usage summary interface. However, in these scenarios, the app may still need to communicate with the network regulation server to retrieve updated usage statistics corresponding to the electronic device. Accordingly, the instructions may additionally or alternatively include any communications that indicate the updated usage statistics.

According to certain aspects, the instructions may also vary between types of electronic devices. For example, mobile phones and laptop computers may receive different sets of instructions. In one scenario, the type of electronic device may be determined by analyzing a user agent profile received from the electronic device. Accordingly, the user interfaces presented by an electronic device may be optimized for presentation by electronic devices of that particular type.

The user interface may display a list of applications with which the electronic device communicated, as well as an indication of an amount of data transmitted to and/or received from each application. Thus, the user interface enables the user to learn exactly which applications are utilizing the most network resources. Furthermore, the user interface may enable the user to change how data to and/or from each application is regulated by the network. For example, the user may elect to block, unblock, rate limit, prioritize, de-prioritize, and/or perform any other data regulation technique for traffic to and/or from a particular application. When the user makes an election to change a data regulation behavior, the electronic device may transmit an indication to the network operator. In response, the profile database may be updated to change the access profile of the electronic device to indicate the user elections. As a result, when the network regulation server process traffic transmitted from the electronic device, the network regulation server may perform data regulation actions in compliance with the user indicated changes.

A benefit of generating and presenting the usage profile is that network users are given more precise control of their network experience than conventionally possible. Often, when an electronic device exhibits a slow connection and/or other poor network experiences, the cause is due to an application executing on the electronic device that communicates in the background, unbeknownst to the user. As a result, the applications with which the user is knowingly attempting to interact are associated with a poor user experience. However, by generating and presenting the usage profile to the user, the user is provided a toolset for implementing their own personalized network regulation policy that restricts access to the background application. Furthermore, because this network regulation policy is set by the user (i.e., the policy is self-enforcing), any restrictions placed on their own connection may comply with network neutrality principles.

According to aspects, the usage profile may also be analyzed by the network regulation server to improve the network experience for the user of the electronic device. For example, the network regulation server may be able to identify that the use of the local network is anomalous with an access profile assigned to the electronic device. For example, a particular application may utilize a disproportionate amount of network resources associated with the electronic device. Accordingly, if the particular application is not preferred by the access profile, the network operator may transmit a notification to the electronic device informing the user of this disproportionate usage. In response to a user interaction with the notification, the electronic device may present an interface to block data communications with the particular application, freeing up the network resources to be utilized for communications with other applications.

As another example, the network operator may determine that the user purchased an access product tailored for utilizing a first set of applications or services (e.g., basic internet); however, the usage profile may indicate that the user actually utilized a set of applications that more closely aligns with an alternate access product (e.g., business user). Accordingly, the network operator may transmit a notification that recommends that the user purchases the alternate access product.

Although the present disclosure generally refers to the network regulation server performing both the functionality related to regulating traffic from electronic devices, maintaining and/or analyzing usage statistics, and generating user interfaces, it is envisioned that this functionality may be divided across multiple servers (including an authentication server). Accordingly, as it is used herein, the term "network regulation server" does not refer to a single server, but rather, any collection of servers or other similar hardware configurations distributively configured to perform the functionality disclosed herein.

In some embodiments, the network operator may also provide incentives to users to minimize the amount of data utilized by their electronic devices. For example, some access products may be associated with a consumption cap. If an electronic device fails to reach the consumption cap, the balance may be pro-rated and refunded to the user. Additionally or alternatively, the network operator may credit a rewards account corresponding to the user with a number of rewards point proportional to the amount of unconsumed data. In some embodiments, the incentive may additionally or alternatively be based upon an average bandwidth utilized by the electronic device for a time interval. According to certain aspects, the network regulation server may monitor a rate of accrual for the incentives and generate a notification informing the user of the electronic of network configurations that may enable the user to earn the incentives faster. It should be appreciated that this notification may be generated in a manner similar to providing a notification that the use of the local network is anomalous with the access profile.

FIG. 1 depicts an embodiment of an exemplary environment 100 capable of performing the presence-based network authentication capabilities as described herein. The environment 100 may include a local network 105 and an external network 145. Although FIG. 1 depicts only a single local network 105, in some embodiments a network operator may implement a plurality of local networks 105. For example, a network operator may implement a local network 105 within each of a plurality of vehicles (such as airplanes, trains, boats, cars, and so on). The environment 100 may be associated with at least two communication links; a local communication link 137 to provide connectivity to electronic devices 110 while the electronic devices 110 are disposed within the local network 105, and an external communication link 147 between the local network 105 and an external network 145 connected to a public switched telephone network (PSTN) 190 and/or the internet 195. Although the external communication link 147 is depicted as a singular communication link, the external communication link 147 may comprise a plurality of individual communication links. For example, the communication link 147 may include any combination of an Air-to-Ground communication link, a satellite communication link, an Ethernet communication link, and/or any other communicated link associated with capacity constraints.

To this end, the communication system may contain one or more modems 115 configured to be compatible with a plurality of different communication standards utilized by the local communication link 137 and the external communication link 147. For example, the local communication link 137 and the external communication link 147 may utilize communication protocols associated with terrestrial communications (e.g., TDMA, GSM, CDMA, GSM, LTE, WiMAX, Wi-Fi, Ethernet, etc.) and/or associated with frequencies in the $K_a$ band, the $K_u$ band, the L band, and/or any other suitable wireless communication frequency bands. Each of the plurality of modems 115 may be connected to a transmitter (not depicted) for transmitting and receiving communications from the external network. In embodiments where the external communication link 147 is a wireless communication link, the transmitter include one or more antennas. In embodiments where the external communication link 147 is a wired communication link, the transmitter may include an Ethernet transmitter.

Generally speaking, the electronic devices 110 may send and receive data over the local communication link 137 via access points 125. The electronic devices 110 may include any mobile computing device, such as a smartphone, a tablet, a laptop computer, a personal digital assistant, an e-reader, smart glasses, smart watches, or any other mobile computing device capable of wireless communications.

The environment 100 may also include an authentication server 120 to control access to the local communication link 137 and/or the external communication link 147. To this end, the authentication server 120 may interpret a set of non-transitory, computer-readable instructions to perform the bandwidth optimization techniques described herein. As part of the bandwidth optimization techniques, the authentication server 120 may interact with a profile database 150 to assign, update, and/or maintain an access profile storing parameters associated with particular aspects of the network experience for each of the electronic devices 110. In some scenarios, after the electronic devices 110 register with the authentication server 120, the authentication server 120 may query the profile database 150. If there are access profiles in the profile database 150 corresponding to the electronic devices 110, then the authentication server 120 may assign the electronic devices 110 the stored access profiles. Conversely, if there is not currently an access profile associated with the electronic devices 110, the authentication server 120 may assign a default access profile to the electronic devices 110. The authentication server 120 may be further configured to monitor the local communication link 137 to detect any indications transmitted from the electronic devices 110 that a user of the electronic devices 110 wishes to change a corresponding access profile. In response, the authentication server 120 may interact with the profile database 150 to update the corresponding access profile with the indicated changes.

In addition to storing access profiles, the profile database 150 may also store a usage profile corresponding to the electronic devices 110. The usage profile may include historical records that indicate with which applications and/or services the electronic devices 110 communicated. In particular, the usage profile may list any application with which the electronic devices 110 communicated, when the communications occurred, and/or an amount of data communicated. In some embodiments, individual applications may be assigned a category (such as entertainment, news, sports, music, video, and so on). Accordingly, the usage profile may also store historical records at a category level, as well as at an application level.

Although FIG. 1 depicts the profile database 150 interconnected with the authentication server 120, in some embodiments, the profile database 150 may actually be a component of the authentication server 120. Furthermore, although FIG. 1 depicts the profile database within the local network 105, it should be appreciated that the profile database 150 may additionally or alternatively be located outside of the local network 105, such as at a location accessible via the external network 145. For example, in some embodiments, a network operator may implement a centralized profile database (not depicted) which maintains a master database of all user access profiles. In these embodiments, each local database 150 located within a local network (such as the local network 105) may be periodically synchronized with the centralized profile database. In these embodiments, any changes made to an access profile stored by the profile database 150 within the local network 105 are propagated to first to the centralized profile database, then every other profile database 150 located in each other local network 105. As a result, the electronic devices 110 may be associated with the same access profile as the electronic devices are carried within any local network 105 operated by the network operator.

The local network 105 may also include a network regulation entity 140 for controlling data communicated over the external communication link 147. To this end, any data generated by the electronic devices 110 within the local network 105 may be routed to the network regulation server 140 prior to transmission over the external communication link 147. If the network regulation server 140 determines that data should be transmitted over the external communication link 147, network regulation server 140 may route the data to the plurality of modems 115 which forward and/or transmit this data to the external network 145 via the external communication link 147 for routing to the addressed location via, for example, the PSTN 190 or the internet 195. As part of this determination, the network regulation server 140 may then query the profile database 150 to retrieve an access profile associated with the electronic devices 110. To this end, the network regulation server 140 may identify a particular electronic device 110 by analyzing the header of a data packet routed to the network regulation server 140. The network regulation server 140 may then retrieve the access profile stored in the profile database 150 corresponding to the particular electronic device 110. The network regulation server 140 may then process the data packet in accordance with the access profile. For example, depending on the particular parameters stored in the retrieved access profile, the network regulation server 140 may block the data packet, delay the transmission of the data packet, transmit the data packet, prioritize, de-prioritize, and/or perform any other network regulation activity.

In some embodiments, the network regulation server 140 may analyze a series of data packets received from a particular electronic device 110 to determine the appropriate network regulation activity. As an example, the access profile may indicate that communications relating to VOIP should be blocked and communications relating to web browsing may be allowed. In this example, the network regulation server 150 may determine whether a data packet corresponds to a VOIP call by, for example, analyzing a destination address and comparing the destination address to list of known VOIP destinations. However, the destination address may not always be readily obtained. Accordingly, the network regulation server 140 may instead analyze a series of data packets (i.e., traffic) transmitted by a particular electronic device 110 to determine whether the series of data packets exhibit characteristics of a VOIP call.

Figure 2:
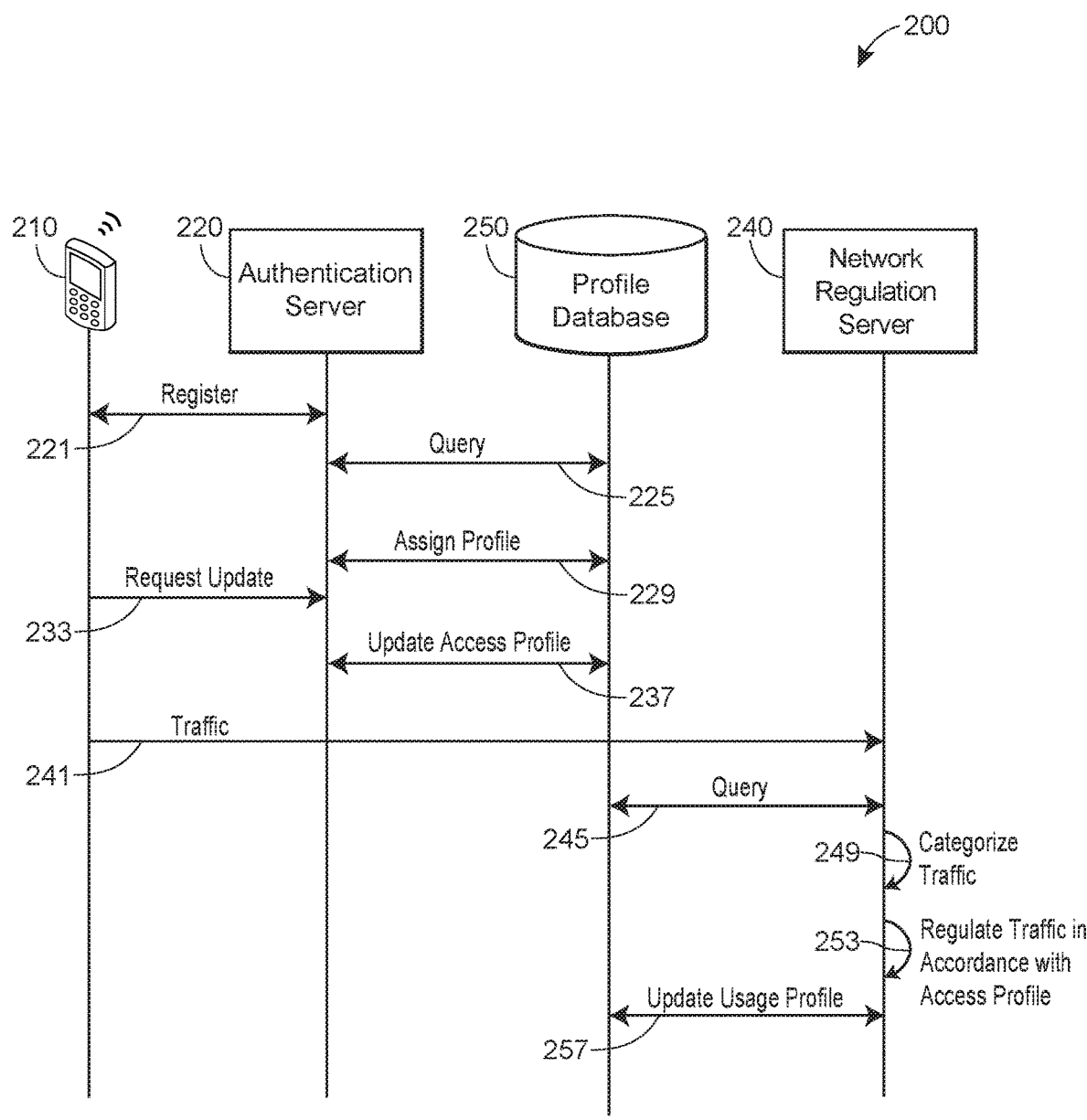
FIG. 2 illustrates an example signal diagram in which a network regulation server, such as the network regulation server 140 of FIG. 1, regulates traffic originated by an electronic device, such as one of the electronic devices 110 of FIG. 1.

Turning to FIG. 2, illustrated is an example signal diagram 200 in which a network regulation server 240, such as the network regulation server 140, regulates traffic originated by an electronic device 210, such as one of the electronic devices 110. The network regulation server may be interconnected with a profile database 250, such as the profile database 150.

The signal diagram 200 may begin when the electronic device 210 communicates with an authentication server 220, such as the authentication server 120, to register (221) with a local network (not depicted), such as the local network 105. As part of the registration process, the electronic device 210 may transmit credentials to the authentication server 220. For example, the electronic device may transmit a device identity (e.g., IMSI, MEID, ICCID, pESN, MAC address, and so on), a password (e.g., a WEP password, a WPA password, and so on), and/or an indication that the operator of the device is human (e.g., a CAPTCHA response). Upon the authentication server 220 determining that the electronic device 210 transmitted the correct credentials, the authentication server 220 may authenticate the electronic device 210 to communicate over the local network.

According to aspects, to authenticate the electronic device 210, the authentication server 220 may query (225) the profile database 250 to assign the electronic device 210 an access profile. To this end, the authentication server 220 may utilize the device identity to search for a record in the profile database 250 that corresponds to the electronic device 210. For example, the electronic device 210 may have been utilized within a local network operated by the same (or affiliated) network operator as the current local network. Accordingly, the profile database 250 may already store a record corresponding to the electronic device 210 indicating any services that the user of the electronic device 210 may have purchased (e.g., the electronic device is associated with a multi-use access package) and/or any preferences for regulating applications and/or application categories. In scenarios in which the electronic device 210 does not correspond to a profile within the profile database 250, the profile database 250 may store a default and/or basic access profile for use with new electronic devices. In these scenarios, the authentication server 220 may create a new record within the profile database 250 based upon the default and/or basic access profile corresponding to the electronic device 210.

According to aspects, the authentication server 220 may then assign (229) the electronic device 210 the appropriate access profile (i.e., the corresponding stored access profile and/or the default access profile). In order to actually assign the access profile to the electronic device 210, the authentication server 220 may generate and assign the electronic device 210 an IP address on the local network. The authentication server 220 may then store the assigned IP address in the profile database 250 in an electronic record that corresponds to the electronic device 210. It should be appreciated that the IP address field in the profile database record may be NULL or a specific value that indicates an unassigned IP address whenever the electronic device 210 is not authenticated with a local network.

At some point after the initial assignment of the access profile, the authentication server 220 may detect that the electronic device 210 is requesting (233) an update to the corresponding access profile. The request may be transmitted in response to the user of the electronic device 210 purchasing a service product upon an initial registration (e.g., when the user purchases an access product, such as, for example, via a captive portal presented upon initial use of the local network) and/or in response to the user modifying a particular regulation activity for an application and/or category of applications (e.g., by interacting with a usage summary interface). If the request is in response to the purchase of an access product, the request may identify the access product purchased (such as by use of a product code number). The authentication server 220 may then correlate the identification to a set of access parameters associated with the purchased access product. On the other hand, if the request is in response to a user interaction with a usage summary interface, the request may indicate a specific application (and/or application category) and the regulation activity indicated by the user of the electronic device 210. In any event, the authentication server 220 may determine a set of changes to make to the access profile in the profile database 250 which corresponds to the electronic device 210. The authentication server 220 may then update (237) the corresponding electronic record in the profile database 250 in accordance with the determined set of changes. Although the signal diagram 200 depicts the authentication server 220 receiving the update and updating the access profile, it is envisioned that the network regulation server 240 may additionally or alternatively perform these steps.

After the access profile is updated, the electronic device 210 may transmit (241) a plurality of data packets (i.e., traffic) over the local network. The traffic may be routed to the network regulation server 240 for processing prior to transmission to an external network. In response, the network regulation server 240 may extract an IP address from the header of the individual data packets. The network regulation server 240 may then use the extracted IP address to query (245) the profile database 250 in order to identify the access parameters stored in the access profile corresponding to the electronic device 210.

The network regulation server 240 may also categorize (249) the traffic transmitted by the electronic device 210. The categorization may begin by first identifying a number of communication sessions in which the electronic device 210 is currently engaged. In many scenarios, the electronic device 210 may communicate with a plurality of different applications simultaneously (i.e., engaged in a plurality of different communication sessions simultaneously). Thus, the network regulation server 240 may identify that the traffic currently supports multiple communication sessions. The network regulation server 240 may then separate the traffic into individual data streams corresponding to each communication session. The network regulation server 240 may further correspond the data stream to an application and/or application category. As an example, a communication session may correspond to an application through analysis of a destination address indicated by the header of a data packet. To this end, the network regulation server 240 may be associated with a reference table that maps popular destination addresses and/or strings within a FQDN to an application name and/or an application category. Accordingly, the network regulation server 240 may separate the traffic into individual communication sessions based upon the destination address and then, utilizing the destination address, query the reference table to identify an application supported by each communication session within the traffic. In some embodiments, the network regulation server 240 may also further categorize each communication session as belonging to a category of applications.

While the mapping table may enable the network operator to determine the application name and/or category for many types of applications, the lookup table may not be effective for identifying applications that transmit data via secured communications. For example, when an electronic device is engaged in a VPN connection, the destination address of the traffic may be the address of the VPN server regardless of specific type of data being communicated. For these types of communications, when the electronic device 210 is engaged in a video conferencing call within a VPN session the destination address may be insufficient to categorize the traffic as a video conference call. Accordingly, when the network regulation server 240 determines that the electronic device 210 is engaged in a secured communication, the network regulation server 240 may analyze a plurality of characteristics of the data stream to determine a probable application category for the communication session within the secured communication session. For example, VOIP calls and/or streaming video may be associated with a particular set of transmission characteristics. Accordingly, the network regulation server 240 may compare measured transmission characteristics of the data stream addressed to the secured server to known sets of transmission characteristics indicative of particular types of applications and/or application categories. As a result of this comparison, the network regulation server 240 may be able to identify an application and/or application category corresponding to the secured communication session.

After the network regulation server 240 has identified the application and/or application category of each communication session and/or data stream within the received traffic, the network regulation server 240 may regulate (253) the traffic in accordance with the access profile corresponding to the electronic deice 210. To this end, the network regulation server 240 may compare each application and/or application category associated with a data stream to the queried access profile to determine a respective regulation activity to apply to each data stream. For example, the access profile may indicate that video traffic should be blocked but email traffic should be allowed. In this example, if the electronic device 210 transmits both video and email data, the network regulation server 240 may block the video data from being transmitted to an external network; whereas the network regulation server 240 may route the email data over an external communication link to respectively corresponding destination addresses.

In some embodiments, the regulation activity may involve traffic shaping techniques. For example, the access profile may indicate that a data stream should be rate limited, prioritized, or de-prioritized. In the rate limiting example, the network regulation server 240 may calculate a byte volume for the data packets comprising a particular communication session. If the byte volume exceeds a threshold value indicated by a rate cap within the access profile, the network regulation server 240 may delay and/or queue the transmission of some of the data packets within the data stream, thereby enforcing a maximum transmission rate for the communication session.

In embodiments that implement packet prioritization, the network regulation server 240 may associate all communication sessions with a default priority, and, after identification and/or categorization of a communication session as a particular application and/or application category, change the appropriate priority levels in accordance with the access profile. Thus, a regulation activity to prioritize or de-prioritize an application and/or application category may involve setting a priority level above or below the default priority level. Furthermore, the network regulation server 240 may support varying levels of prioritization. For example, VPN traffic may be a assigned a highest priority level and weather data may be assigned a high priority level. In this example, the network regulation server 240 may assign both VPN and weather communication sessions a higher than default priority level but the VPN communication session may be assigned a priority level even higher than the weather communication session.

It should be appreciated that the regulation activities disclosed throughout the present application may be utilized in combination with one another. For example, in the previous example, the access profile may indicate that communications sessions with a particular weather information provider should be blocked. Accordingly, the network regulation server 240 may block communications with the particular weather information provider and still prioritize communications with other weather information providers.

To enforce the packet prioritization, the network regulation server 240 may first calculate an overall byte volume of traffic received from the electronic device 210. The network regulation server 240 may then compare the overall byte volume to a maximum rate and/or bandwidth limit stored in the access profile corresponding to the electronic device 210. If the overall byte volume is less than a threshold byte volume derived from access profile parameters, the network regulation server 240 may transmit all data packets transmitted by the electronic device 210 (that are not otherwise regulated) over the external communication link. In many scenarios, however, the received byte volume may exceed the threshold byte volume indicated by the corresponding access profile. In these scenarios, the network regulation server 240 may analyze the priority data to determine an order by which the network regulation server 240 routes the received data packets over the external communication link. As an example, the network regulation server 240 may first route the data packets associated with the highest priority level until the maximum byte volume is reached. Once the threshold byte volume is reached, any data packets that did not get transmitted may be queued for transmission when the electronic device 210 is transmitting less data.

It should be appreciated that if the electronic device 210 transmits enough high priority data, lower priority data may be delayed to the point where the corresponding communication sessions time out. Thus, in effect, the network regulation server 240 may inadvertently block these communication sessions. Accordingly, the network regulation server 240 may cap the amount of prioritized data at a threshold percentage of the overall bandwidth assigned to the electronic device 210 whenever data packets are queued for a later transmission. In one example, the network regulation server 240 may cap prioritized communications at 65% of the maximum bandwidth and default priority communications at 25% of the maximum bandwidth. In this example, 10% of the maximum bandwidth is reserved for queued deprioritized communications. It should be appreciated that the proportions assigned to each cap, as well as any grouping of different priority levels within a particular cap, may vary depending on the byte volume and priority level of the queued data packets. As a result, network regulation server 240 may still enforce packet prioritization while increasing the likelihood that lower priority communication sessions will not time out. Moreover, because the priority levels are set by the user of the electronic device 210, the packet prioritization techniques described with respect to the signal diagram 200 conform to network neutrality principles.

According to certain aspects, after regulating the received traffic, the network regulation server 240 may also update (257) a usage profile within the profile database 250 that corresponds to the electronic device 210. More particularly, the network regulation server 240 may track and/or other maintain statistics regarding any network regulation activity performed by the network regulation server 240 to the received traffic. As an example, the network regulation server 240 may maintain statistics regarding a measured byte volume of the data packets corresponding to a particular application and/or application category. For each application and/or application category, the network regulation server 240 may also maintain statistics regarding, for example, a byte volume of data that was allowed without applying traffic shaping techniques, a byte volume of data that was blocked, a byte volume of data that was queued, and/or any other relevant statistics that characterize how the network regulation server 240 regulated the received traffic. It should be appreciated that the usage profiles stored by the profile database 250 may correspond to the statistics maintained by the network regulation server 240. Accordingly, the network regulation server 240 may utilize the maintained statistics to update the corresponding statistics stored within the usage profile to ensure that the stored usage profile accurately indicates how the network regulation server 240 has regulated the traffic received from the electronic device 210.

Figure 3:
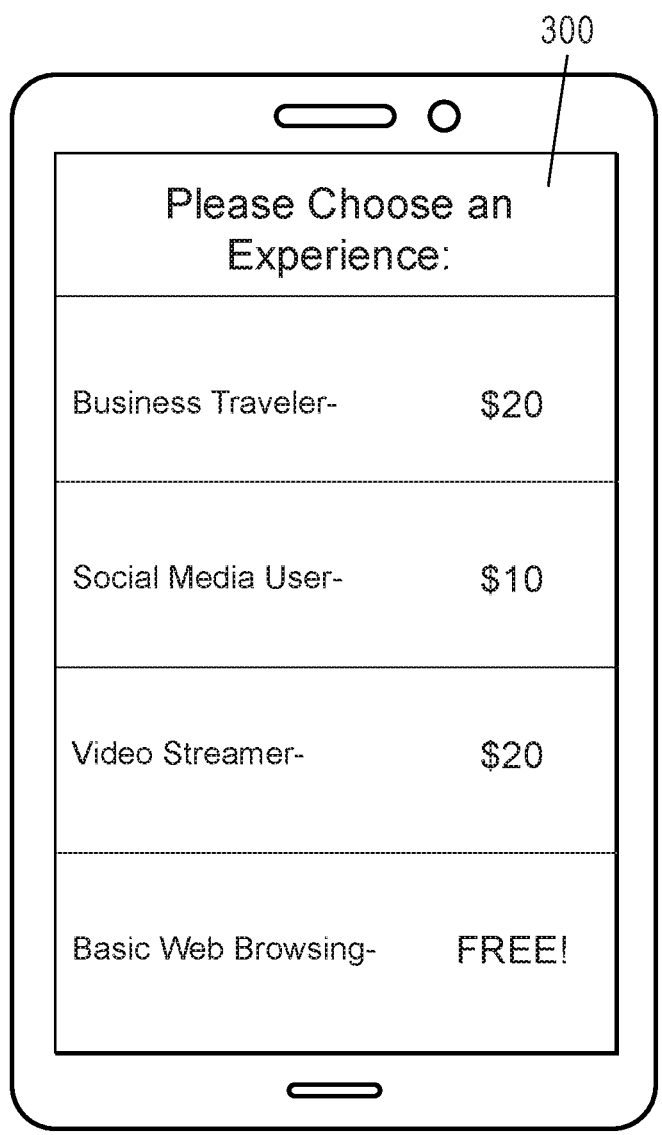
FIG. 3 is an exemplary interface displayed on an electronic device, such as one of the electronic devices 110 of FIG. 1, associated with the user purchase of an access product.

Turning now to FIG. 3, depicted is an exemplary interface 300 associated with a user purchasing an access product. The interface 300 may be presented on an electronic device (such as one of the electronic devices 110 or 210). Although FIG. 3 depicts the interface 300 being presented by a smart phone, the interface 300 may be presented by any type of electronic device, such as a tablet, a laptop computer, a personal digital assistant, an e-reader, smart glasses, smart watches, or any other mobile computing device capable of wireless communications. It should be appreciated that FIG. 3 depicts only one exemplary interface and other interfaces may be implemented without departing from the scope of the present disclosure. One such interface may be one that facilitates audio commands provided to a concierge application that executes on the electronic device.

The exemplary interface 300 may be presented after a user carries the electronic device within a local network configured to perform the disclosed bandwidth optimization techniques (such as the local network 105). More particularly, the interface 300 may be when the user of the electronic device attempts to access a webpage and/or otherwise communicate over the local network. As depicted, the interface 300 may request that the user purchases an access product associated with a prioritized set of applications. In the depicted example, the interface 300 presents an option to select between a business traveler experience (whereby VPN and email applications may be preferred), a social media user experience (whereby social media applications may be preferred), a video streamer experience (whereby video streaming applications may be preferred), and a basic web browsing experience (whereby applications other than general web browsing may be blocked). The interface 300 may also display a cost corresponding to each available access product.

The interface 300 may be further configured to receive, as user input, a selection of a particular access product. As described above, the access product may correspond to an access profile that prioritizes applications in accordance with the user experience indicated by the access product. Accordingly, in response to receiving the user input indicating a selection of an access product, the electronic device may transmit a request over the local network indicating the selected access product and/or an identity of the electronic device (e.g., an IMSI, a MEID, an ICCID, a pESN, a MAC address, and so on). In response, the local network may assign the indicated access profile to the electronic device. As result, when the electronic device subsequently transmit data over the local network, the local network processes the data in accordance with the purchased access profile.

Figure 4:
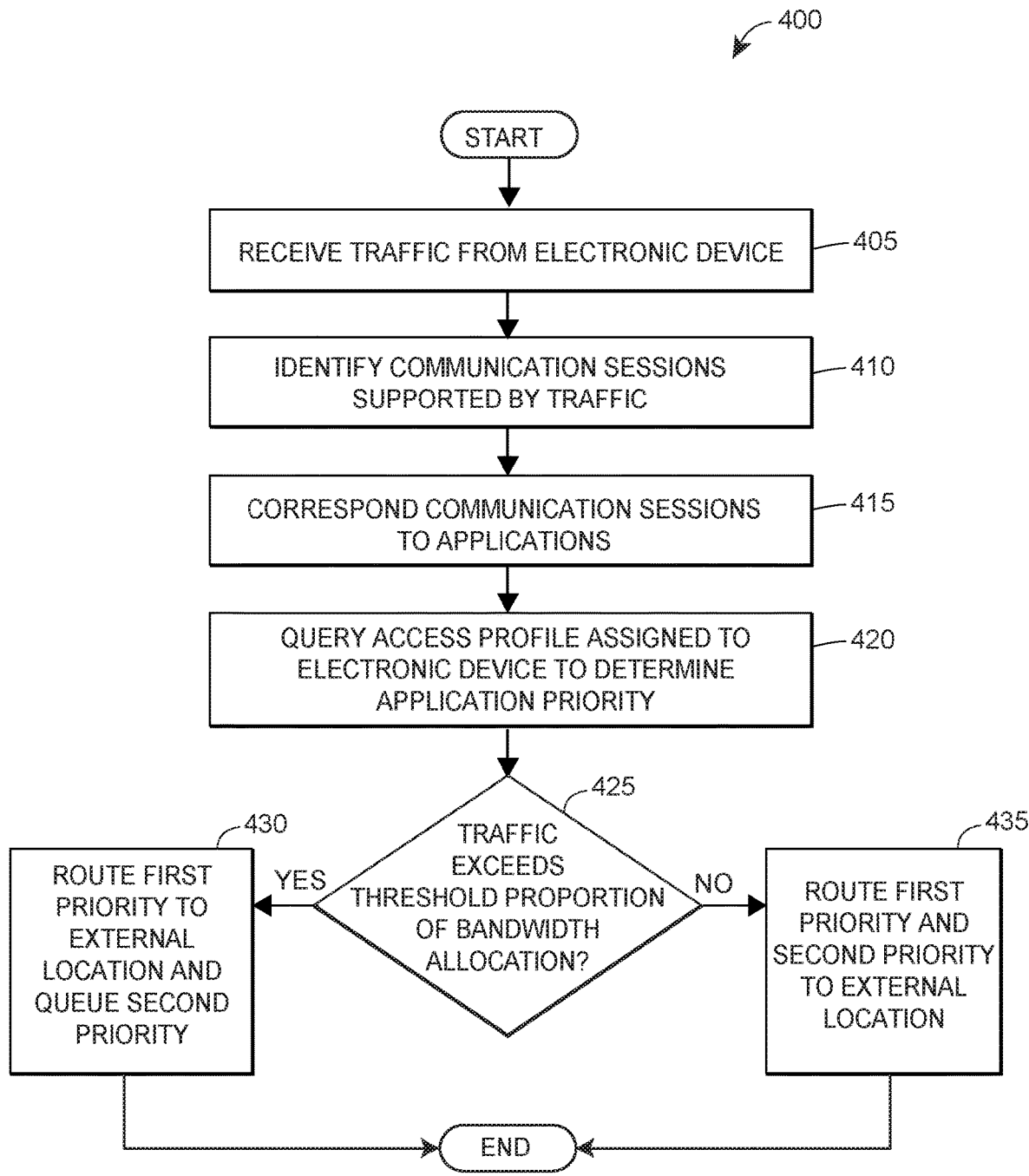
FIG. 4 is an example flow diagram of an example method for performing the user-directed bandwidth optimization techniques, which may be implemented in the communication system depicted in FIG. 1.

FIG. 4 depicts an example flow diagram of an example method 400 for performing the user-directed bandwidth optimization techniques. The method 400 may be performed by a network regulation server (such as one of the network regulation servers 140 or 240) in communication with an electronic device (such as one of the electronic devices 110 or 210) over a local network (such as the local networks 105). The network regulation server may also be interconnected with a profile database (such as one of the profile databases 150 or 250) storing an access profile assigned to the electronic device.

The method 400 may begin when the network regulation server receives traffic (i.e., a plurality of data packets) that was transmitted from the electronic device (block 405). The network regulation server may then identify a plurality of communication sessions supported by the traffic (block 410). The individual communication sessions may be identified by analyzing header data included in the individual data packets that comprise the traffic. After the network regulation server has identified the individual communication sessions, it may separate the data packets within the traffic into data streams that correspond to individual communication sessions.

The network regulation server may then correspond each data stream (and therefore each communication session) with an application (block 415). To this end, the network regulation server may again analyze information contained within the header data. For example, the header data may indicate a destination address. Accordingly, the network regulation server may utilize the destination address to query a reference table that correlates particular addresses with applications. The network regulation server may then query the access profile corresponding to the electronic device to determine a priority level for the identified applications (block 420). To this end, the access profile may store indications of a priority level that should be assigned to the applications. In some embodiments, the access profile may also store indications of a priority level for applications comprising a plurality of different application categories. Thus, the network regulation server may assign to each identified application the priority level that corresponds to the one stored in the access profile for the respective application and/or application category.

After each application has been assigned a priority level, the network regulation server may determine whether a measured byte volume for the traffic exceeds a threshold proportion of an overall bandwidth allocation indicated by the access profile (decision 425). If the measured byte volume of the traffic does not exceed the threshold proportion (the "NO" fork), the network regulation server may route and/or transmit data streams corresponding to applications associated with a first priority level (e.g., a comparatively higher priority level) as well data streams corresponding to applications associated with a second priority level (e.g., a comparatively lower priority level) to locations external the local network (block 435). Conversely, if the measured byte volume of the traffic exceeds the threshold proportion (the "YES" fork), the network regulation server may route and/or transmit data streams corresponding to applications associated with the first priority level to locations external the local network; whereas data streams corresponding to applications associated with the second priority level are queued (block 430). It should be appreciated that when the measured byte volume of the traffic falls back below the threshold proportion of the total bandwidth allocation, the network regulation server may then route the queued data streams to the locations external the local network. Additionally, as described above, in some embodiments, the network regulation server may cap the amount of data assigned the first priority level to ensure that communication sessions facilitated by queued data streams do not time out.

Figure 5:
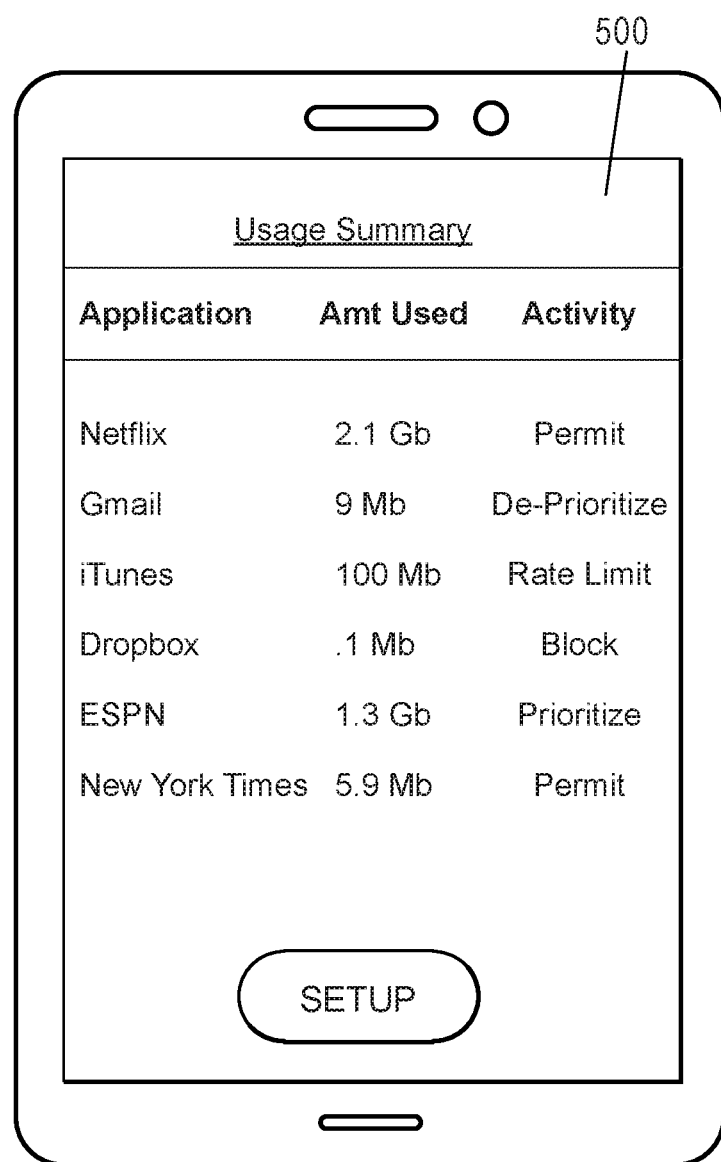
FIG. 5 is an exemplary interface displayed on an electronic device, such as one of the electronic devices 110 of FIG. 1, associated with presenting a usage summary.

Referring to FIG. 5, depicted is an example interface 500 associated with a usage summary interface. The interface 500 may be presented on an electronic device (such as one of the electronic devices 110 or 210). Although FIG. 5 depicts the interface 500 being presented on a display of a smart phone, the interface 500 may be presented on a display of any type of electronic device, such as a tablet, a laptop computer, a personal digital assistant, an e-reader, smart glasses, smart watches, or any other mobile computing device capable of wireless communications. The interface 500 may include a display region in which the interface 500 is able to control the information displayed on the display of the electronic device. It should be appreciated that FIG. 5 depicts only one example interface and other interfaces may be implemented without departing from the scope of the present disclosure. For example, one such interface may incorporate an audio interface for receiving voice commands provided via a concierge application executing on the electronic device (e.g., Siri®).

The exemplary interface 500 may be presented within application executing on the electronic device, for example, the interface 500 may be presented by a web browser and/or an application distributed by a network operator. Accordingly, when the interface 500 is first presented, the electronic device may transmit a HTTP query to a network regulation server (such as the network regulation server 140) or an authentication server (such as the authentication server 120) within a local network (such as the local network 105) to retrieve a plurality of information about the applications the electronic device has interacted with while connected to the local network. As depicted on the interface 500, this information may be categorized by application and include an amount of data used and a currently assigned network regulation activity for each application. The network regulation activities may include permit, block, prioritize, de-prioritize, rate limit, etc. Further, although not depicted on the interface 500, the interface 500 may be configured to display other network usage statistics for each application, including an amount of data blocked, a current or average latency, a current or average throughput of data, and other similar statistics. Further still, although the interface 500 only lists six applications, the interface 500 may be configured to present usage statistics for any number of applications with which the electronic device has interacted while within the local network. It should be appreciated that only a subset of all applications with which the electronic device has interacted while within the local network may be presented by the interface 500. According to certain aspects, the interface 500 may also present an amount of incentives and/or reward points (not depicted) earned based upon interactions between the electronic device and the local network (e.g., data usage and/or the assigned regulation activities).

According to certain aspects, the interface 500 may include a selectable interface element (the "setup" button) that, when selected, causes the electronic device to present a secondary interface for customizing the information presented by the usage summary interface. For example, the secondary interface may enable the user to select, modify, and/or customize which usage statistics are presented by the interface 500 and/or enable the user to change a number of applications presented by the interface 500. Consequently, the interface 500 and/or the electronic device may be configured to detect input to the secondary interface and transmit an information request to the network regulation server and/or authentication server to retrieve any information not previously presented by the interface 500.

Additionally, for each application displayed on the interface 500, the interface 500 may also include a selectable interface element that enables the user of the electronic device to modify the network regulation activity performed to communication sessions that correspond to the application. As depicted on the interface 500, this interface element may be the text indicating the network regulation activity. It is envisioned that other interfaces may provide other selectable interface elements, for example, a button labeled modify, a drop down menu, a radio menu selection, and/or other known interface elements for receiving a user selection. To this end, the interface 500 may be configured to detect that the user has modified a network regulation activity for an application. In response, the interface 500 may cause the electronic device to transmit an instruction and/or request to the network regulation server and/or authentication server to update a profile in accordance with the user modification.

According to certain aspects, the interface 500 may be further configured to update the presented network usage statistics while the interface 500 is being presented. To this end, some applications may engage in background communication sessions, thus, the amount of data used by a particular application may increase while the interface 500 is presented by the electronic device. Further, some usage statistic may represent a transient characteristic about a communication sessions (e.g., throughput and latency). In order to ensure that interface 500 presents current network usage statistics, the interface 500 may cause the electronic device to periodically poll the network regulation server and/or authentication server to receive updated network usage statistics. It should be appreciated that in some embodiments, the update period may be configured to be small enough to make the network usage statistics appear to the user as if the statistics are updating in real time.

Figure 6:
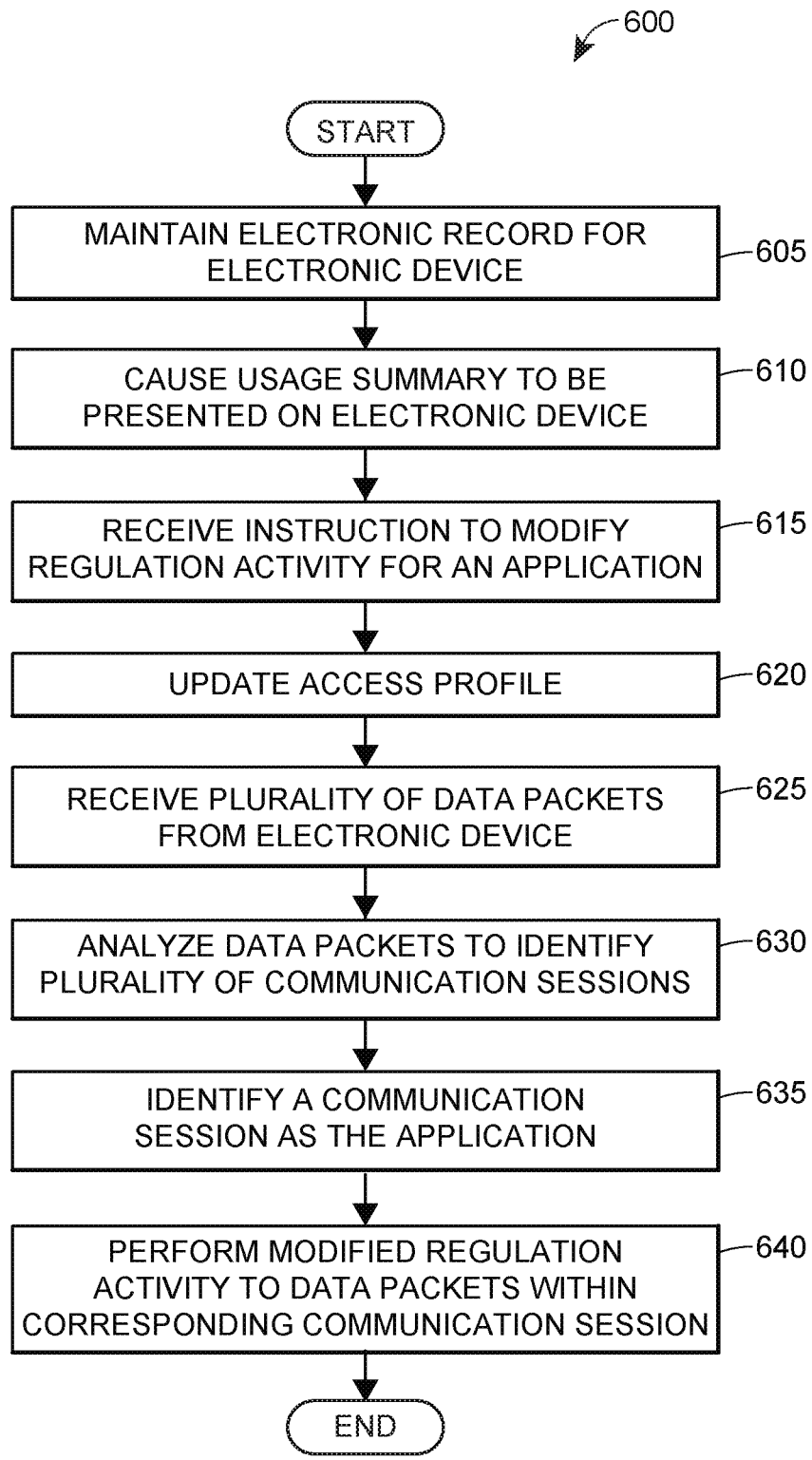
FIG. 6 is an example flow diagram of an example method for performing the usage-based bandwidth optimization techniques, which may be implemented in the communication system depicted in FIG. 1.

FIG. 6 depicts an example flow diagram of an example method 600 for performing the usage-based bandwidth optimization techniques described herein. The method 600 may be performed by a network regulation server (such as one of the network regulation servers 140 or 240) in communication with an electronic device (such as one of the electronic devices 110 or 210) over a local network (such as the local network 105). The network regulation server may also be interconnected with a profile database (such as one of the profile databases 150 or 250) storing an electronic record corresponding to the electronic device.

The method 600 may begin by maintaining the electronic record stored in the profile database that corresponds to the electronic device (block 605). The profile may include both an access profile that indicates which regulation activity should be performed on data corresponding to each plurality of applications, as well as a usage profile which indicates a plurality of usage statistics for the plurality of applications. As part of maintaining the electronic record, the network regulation server may update the usage statistics in response to processing data transmitted by the electronic device. This may involve similar actions as those described with respect to step 257 of the signal diagram 200.

According to certain aspects, the network regulation server may detect that the electronic device is attempting to view a usage summary interface. For example, the local network may associate the usage summary interface with a particular IP address on the local network. Accordingly, when the network regulation server detects that the electronic device is attempting to navigate to the particular IP address, the network regulation server may cause the usage summary interface to be presented to the user by the electronic device (block 610). To this end, the network regulation server may generate a set of computer readable instructions to be executed by the electronic device. These instructions may include HTML resources, JavaScript applets, a Cascading Style Sheets component and/or other known software elements that facilitate the remote presentation of a user interface. As part of generating the instructions, the network regulation server may query the usage profile to determine values for the various usage statistics and regulation activities presented by the usage summary interface. These queried values may then be incorporated into the generated instructions. According to certain aspects, the request received by the network regulation server may include an indication of the specific usage statistics the electronic device is attempting to present to the user via the usage summary interface. Upon generating the instructions, the network regulation server may transmit the generated instructions to the electronic device for execution.

At some point after the network regulation server transmits the generated instructions to the electronic device, the network regulation server may receive an instruction to modify a regulation activity for a particular application (block 615). As an example, the regulation activity for the particular application may currently permit data packets to be routed over an external communication link. In this example, the received instruction may indicate that user wishes to change the regulation activity for the particular application to block data packets from being routed over the external communication link. In response, the network regulation server may update the profile corresponding to the electronic device in the profile database in accordance with the received instruction (block 620). More particularly, the network regulation server may update the access profile corresponding to the electronic device to indicate that data packets that correspond to the particular application should be regulated as indicated by the received instruction. Further, because the received instruction is generated at the direction of the user of the electronic device, the change to the access profile may comply with network neutrality principles.

In some optional embodiments, the network regulation server may also receive an information request from the electronic device after transmitting the generated instructions to the electronic device. To this end, the information request may indicate that the usage summary profile settings have been modified to present information that was not previously presented. For example, the user of the electronic device may have interacted with the electronic device to change the usage statistics presented by the usage summary interface and/or change the number of applications presented by the usage summary interface. In response, the network regulation server may query the usage profile corresponding to the electronic device to retrieve the requested information. For example, the information request may indicate that the usage summary interface settings have been modified to indicate that the latency for a particular application should now be presented by the usage summary interface. Accordingly, the network regulation server may query the usage profile for the electronic device to retrieve the latency value corresponding to the particular application. Upon retrieval, the network regulation server may transmit the latency value to the electronic device for presentation by the usage summary interface. Similarly, in response to an information request for an application not previously presented by the usage summary interface, the network regulation server may retrieve and transmit information stored in the usage profile for the indicated application.

Subsequently, the network regulation server may then receive a plurality of data packets addressed to locations external the local network (i.e., traffic) from the electronic device (block 625). The network regulation server may then analyze the received data packets to identify a plurality of communication sessions supported by the data packets (block 630). According to certain aspects, if the electronic device attempted to send data packets associated with the particular application, then the network regulation server will identify one of the plurality of communication sessions as corresponding to the particular application (block 635). As a result, the network regulation server may perform the regulation activity indicated in the received instruction to the communication session that corresponds to the particular application (block 640). It should be appreciated that the actions performed at blocks 620-640 may involve substantially similar actions to those described with respect to steps 241-253 of the signal diagram 200, respectively. Further, the steps performed as part of the method 600 may additionally or alternatively be performed by the authentication server instead of the network regulation server.

Figure 7:
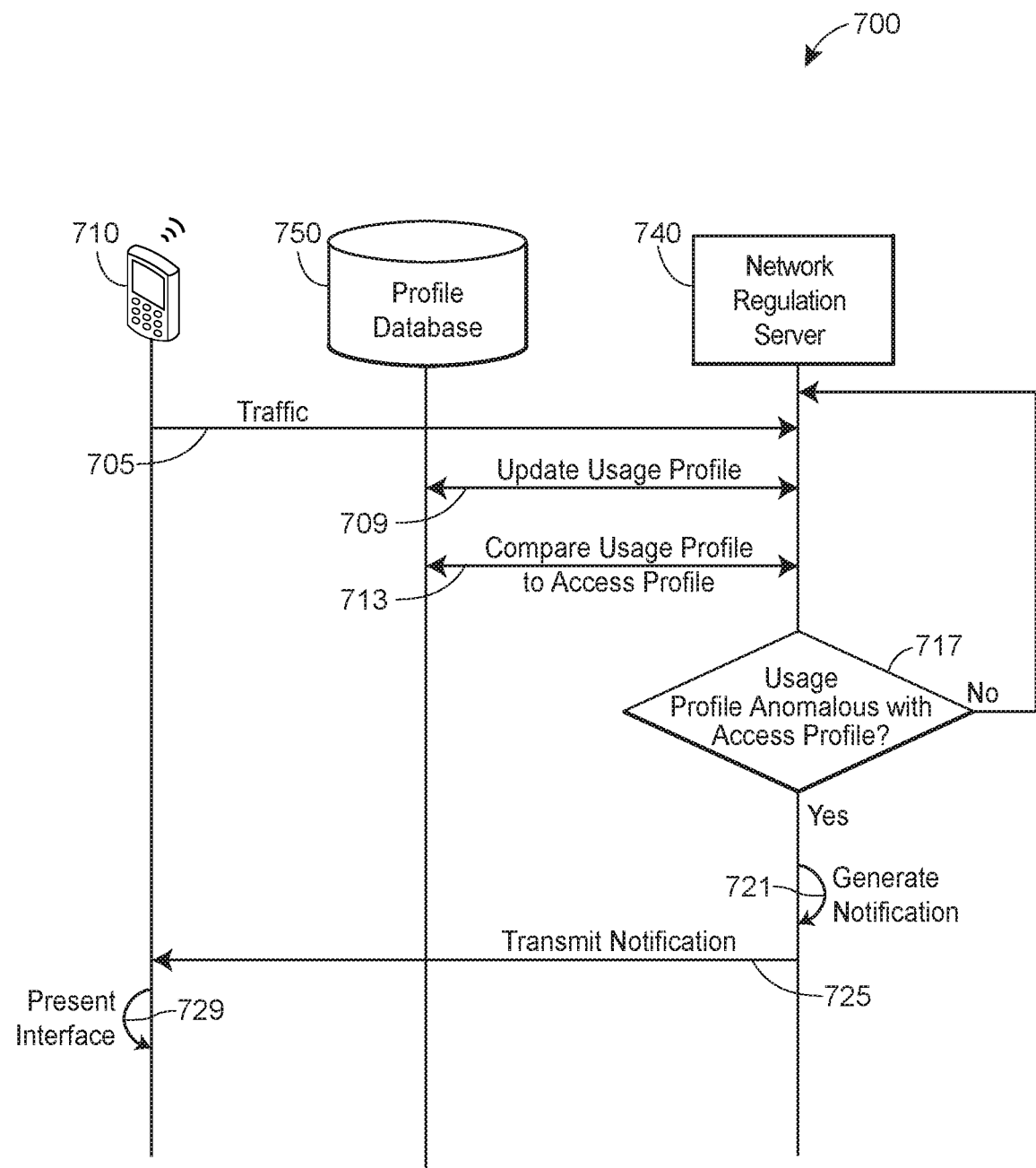
FIG. 7 illustrates an example signal diagram in which a network regulation server, such as the network regulation server 140 of FIG. 1, generates an access profile configuration notification for an electronic device, such as one of the electronic devices 110 of FIG. 1.

Turning to FIG. 7, illustrated is an example signal diagram 700 in which a network regulation server 740, such as one of the network regulation server 140 or 240, generates an access profile configuration notification for an electronic device 710, such as one of the electronic devices 110 or 210. The network regulation server may be interconnected with a profile database 750, such as one of the profile database 150 or 250.

The signal diagram 700 may begin when the electronic device 710 transmits (705) traffic over a local network (such as the local network 105). For example, the traffic may be address to various locations external the local network to support a plurality of communication sessions with a plurality of applications. According to aspects, the traffic may be routed to the network regulation server 740 for processing prior to transmission to an external network. Additionally, the network regulation server 740 may analyze the traffic to generate a plurality of usage statistics characterizing the traffic. After generating the usage statistics, the network regulation server 740 may update (709) the usage profile within the profile database that corresponds to the electronic device 710. This update to the usage profile may occur in a similar manner as described with respect to step 257 of the signal diagram 200.

At some point after the usage profile corresponding to the electronic device 710 contains usage statistics, the network regulation server 740 may compare (713) the usage profile to an access profile that also corresponds to the electronic device 710. The network regulation server 740 may then analyze the usage profile to determine an amount of data utilized by each application and/or application category. As part of the comparison, the network regulation server 740 may determine whether the user of the electronic device 710 has purchased the most appropriate access product based on actual usage of the local network.

To this end, each access product may be associated with an expected proportion of data and/or bandwidth usage by application category. For example, a Social Media User access product may expect a higher proportion of data and/or bandwidth to be utilized by applications such as Facebook, Instagram, Twitter, Snapchat, etc. (e.g., applications falling within a social media based application category) than a Video Streamer access product expects. Similarly, the Social Media User access product may expect a lower proportion of data and/or bandwidth to be utilized by applications such as YouTube, Netflix, Hulu, etc. (applications falling within a video streaming based application category) than the Video Streamer access product. It should be appreciated that because video streaming generally utilizes more bandwidth and/or data than social media, in some embodiments, the Social Media User access product may still expect a larger proportion of data and/or bandwidth for video streaming applications than social media applications.

Accordingly, to perform the comparison, the network regulation server 740 may analyze the usage statistics in the usage profile corresponding to the electronic device 710 to determine a relative amount of data and/or bandwidth for a plurality of application categories. Thus, the network regulation server 740 may then compare the determined relative proportions of data utilized by each application and/or application category to an expected proportion of data for each application and/or application category for the purchased access product and at least one other access product available for purchase. More particularly, the network regulation server 740 may calculate a mathematical distance between the application category proportions indicated by the usage profile to the expected proportions for the current purchased access product and at least one alternate access product available for purchase. Accordingly, if the mathematical distance between the actual proportions of usage and those expected by the purchased access product is less than the distance between as compared to the proportions expected by the alternative access products, the usage profile may be congruent with the access profile.

Another example comparison may include the network regulation server 740 determining that the usage profile indicates that a particular application is utilizing a disproportionate amount of data and/or bandwidth as compared to other applications. To this end, the particular application may exceed a threshold proportion of an overall amount of data and/or bandwidth (e.g., 40%) or may exceed the amount of data and/or bandwidth utilized by a next highest application by a threshold proportion (e.g., 10%). In this scenario, the comparison may further involve comparing the particular application to an access product and/or to a priority level in the access profile associated with the particular application and/or application category. To this end, if the particular application corresponds to a high priority level, the disproportionate data and/or bandwidth usage may be congruent with the access profile.

In some embodiments, the comparison may also involve analyzing the usage profile to compare the usage statistics to conditions in which the network operator will provide rewards points and/or incentives to the user of the electronic device 710. For example, the access profile may indicate that reward points may be credited if the electronic device 710 achieves an average bandwidth for a fixed interval (e.g., an hour or a flight) below a threshold proportion (e.g., 80%) of a bandwidth allotment associated with the access product assigned to the electronic device 710. In this example, the comparison may involve identifying any applications for which a corresponding regulation activity may be modified to increase the likelihood that the electronic device 710 achieves the reward condition. It should be appreciated that this comparison may vary based upon the particular reward condition implemented in different embodiments.

After performing the comparison between the usage profile and the access profile, the network regulation server 740 may determine (Decision 717) whether the usage profile is anomalous with the access profile. Referring to the various comparisons described above, the usage profile may be considered anomalous to the access profile if the proportion of data utilized by each application and/or application category aligns more closely with an access product other than the access product purchased by the user (for example, as determined by comparing mathematical distances from the usage profile). Alternatively, the usage profile may be anomalous with the access profile if a particular application utilizes a disproportionate amount of data and/or bandwidth, or if the user may modify a regulation activity for a particular application to increase the likelihood of achieving a reward condition. If the usage profile is not anomalous with the access profile (the "NO" fork), processing may return to the beginning of the signal diagram 700 where the network regulation server 740 awaits further traffic from the electronic device.

Conversely, if the usage profile is anomalous with the access profile (the "YES" fork), the network regulation server 740 may generate (721) and transmit (725) a notification to the electronic device 710. The notification may be generated such that the notification informs the user that there is an anomalous condition between the corresponding usage profile and the access profile. According to certain aspects, the notification may identify the anomalous condition and inform the user that an access parameter (such as a regulation activity) may be modified to remedy the anomalous condition.

Further, the notification may be generated in accordance with one of several different formats. For example, in some embodiments, the notification may be a SMS or MMS message that includes a textual description of the anomalous condition and a link to open an interface to remedy the anomalous condition. Because most mobile phones are configured to be able to receive SMS messages, for certain types of electronic devices a SMS notification may be more likely to be interoperable with the electronic device. In other embodiments, the notification may take the form of a push message configured to present the notification via an application distributed by the network operator. Because the application is distributed by the network operator, when the push message is received by an electronic device, a logo associated with the network operator may be presented. Thus the push message format may provide more contextual information that the notification relates to usage of the local network.

Upon receiving the notification, the electronic device 710 may present the notification via a display. In response to the user interacting with the notification (e.g., by selecting a link within the notification or by clicking or tapping the notification itself), the electronic device 710 may present (729) an interface to remedy the anomalous condition. It should be appreciated that, based upon the anomalous condition, the notification may be configured to present a different interface in response to a user interaction. To this end, if the anomalous condition is related to the appropriateness of a purchased access product, the interface presented may enable the user to purchase or otherwise cause the more appropriate access product to be assigned to the electronic device 710. One such example interface may be interface 300 described with respect to FIG. 3. On the other hand, if the anomalous condition may be remedied by changing a regulation activity for a particular application and/or application category, the interface presented may enable the user to modify a regulation activity associated with the particular application and/or application category. One such example interface may be the interface 500 described with respect to FIG. 5. It should be appreciated that because the anomalous condition is remedied at the user's direction via the presented interface, the signal diagram 700 may comply with network neutrality principles.

Figure 8:
FIG. 8 is an exemplary interface displayed on an electronic device, such as one of the electronic devices 110 of FIG. 1, associated with the access profile configuration notification.

Turning now to FIG. 8, depicted is an exemplary interface 800 associated with the access profile configuration notification. The interface 800 may be presented on an electronic device (such as one of the electronic devices 110, 210, or 710). Although FIG. 8 depicts the interface 800 being presented by a smart phone, the interface 800 may be presented by any type of electronic device, such as a tablet, a laptop computer, a personal digital assistant, an e-reader, smart glasses, smart watches, or any other mobile computing device capable of wireless communications. It should be appreciated that FIG. 8 depicts only one exemplary interface and other interfaces may be implemented without departing from the scope of the present disclosure. One such interface may be one that facilitates audio commands provided to a concierge application that executes on the electronic device.

As depicted in FIG. 8, the interface 800 may include a notification region. Although the interface 800 depicts the notification region at the top of a display, the notification region may located at any location on the display. According to aspects, when the electronic device receives notifications, such as via a push message or SMS message, the notification may appear in the notification region. In the depicted scenario, the notification may include a suggestion of a change that may be made to an access profile corresponding to the electronic device that may remedy any anomalous usage condition ("Based on your network usage . . . ").

According to certain aspects, the notification may be configured such that a new interface is presented in response to a user interaction with the notification. For example, as indicated by the depicted logo in the notification region, the electronic device may have an application associated with a network operator installed. Accordingly, the notification may have been configured to indicate to the application that the anomalous usage condition exists. In response, the application may have caused the notification to appear in the notification regions as depicted by the interface 800. The electronic device may further monitor the notification while it is presented in the notification region to await the reception of user input (e.g., a tap or click). Upon receiving the user interaction, the application may cause the electronic device to present another interface to enable the user to remedy the anomalous condition. For example, in the depicted scenario, the application may cause the electronic device to present an interface (such as an interface within the application or an interface as part of a web browser) to purchase the Video Streamer access product.

Figure 9:
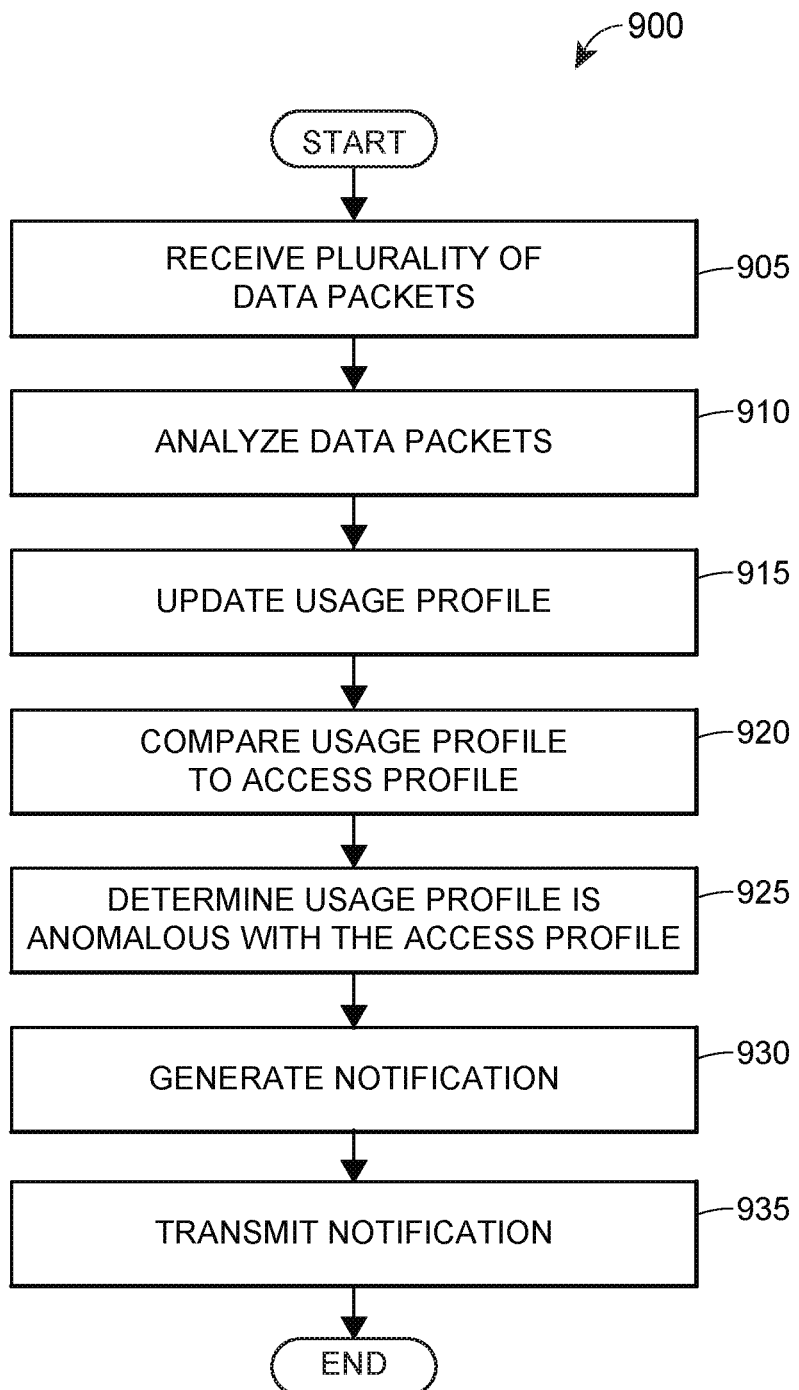
FIG. 9 is an example flow diagram of an example method for generating access profile configuration notifications, which may be implemented in the communication system depicted in FIG. 1.

Referring now to FIG. 9, depicted is an example flow diagram of an example method 900 for generating a network profile configuration assistance notification described herein. The method 900 may be performed by a network regulation server (such as one of the network regulation servers 140, 240, or 740) in communication with a plurality of electronic devices (such as a plurality of the electronic devices 110, 210, or 710) over a local network (such as the local network 105). The network regulation server may also be interconnected with a profile database (such as one of the profile databases 150, 250, or 750) storing an electronic record corresponding to the plurality of electronic devices.

The method 900 may begin when the network regulation server receives a plurality of data packets or traffic from the plurality of electronic devices (block 905). To this end, an access point within the local network may route the plurality of data packets to the network regulation server if the data packets are addressed to a location external to the local network. In response, the network regulation server may analyze the plurality of data packets (block 910). More particularly, the network regulation server may segment the plurality of data packets into a plurality of sets of data packets based upon the particular electronic device from which each set of data packets originated. For example, the origination electronic device may be determined by analyzing header data to determine an origination IP address, a device identity (e.g., MEID, MAC address, pESN, etc.), or user account information. For each set of data packets originating from a different electronic device, the network regulation analyze the set of data packets to determine a regulation activity to apply to the set of data packets, as well as generate a plurality of usage statistics characterizing the set of data packets. Further, after generating the plurality of usage statistics, the network regulation server may update a usage profile corresponding to the origination electronic device to include the generated usage statistics (block 915).

According to aspects, the network regulation server may periodically analyze each electronic record in the profile database to ensure that the corresponding usage profile is not anomalous with the corresponding access profile. To this end, the network regulation server may compare the usage statistics within the corresponding usage profile to the corresponding access profile (block 920). Based on this comparison, the network regulation server may determine that a usage profile corresponding to a particular electronic device is anomalous with the corresponding access profile (block 925). For example, the usage statistics within the usage profile may indicate that the electronic device has been utilized in manner more congruent with an access product other than the one purchased by the user of the electronic device.

For each electronic record in which the corresponding usage profile is anomalous with the corresponding access profile, the network regulation server may generate a notification to be presented by the corresponding electronic device (block 930). To this end, the notification may inform the user of the corresponding electronic device as to the existence of the anomalous condition, and, in response to a user interaction with the notification, cause the corresponding electronic device to present another interface that enables the user to remedy the anomalous condition. Accordingly, after a notification intended for a particular electronic device is generated, the network regulation server may then transmit the notification to the particular electronic device (block 935). It should be appreciated that the method of transmission for different notifications may vary between and among different electronic devices. As one example, the network generation server may transmit a notification via SMS to a mobile phone, whereas the network generation server may transmit a notification via Wi-Fi to a laptop.

Figure 10:
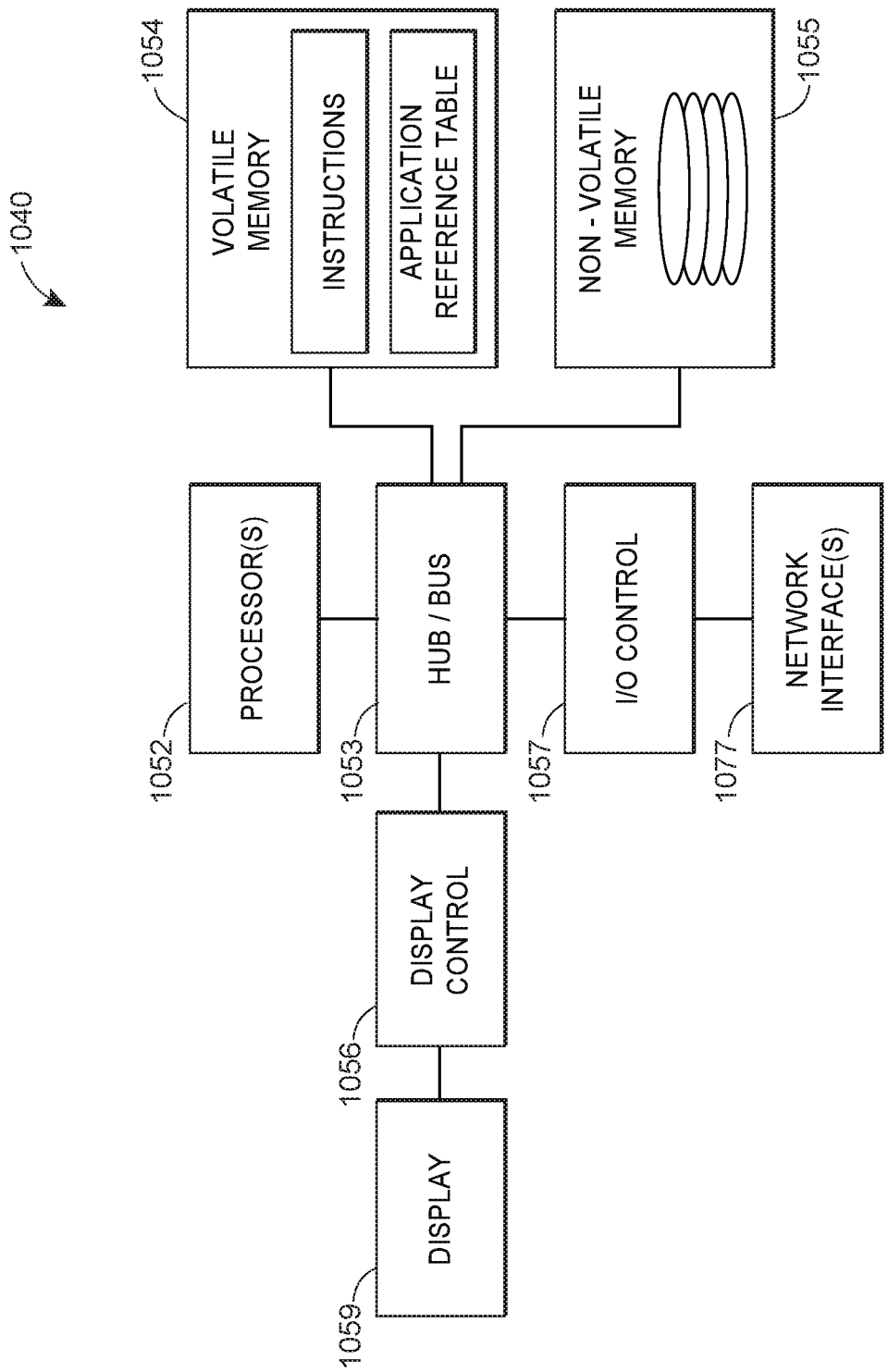
FIG. 10 is a block diagram of a network regulation server that facilitates the bandwidth optimization techniques disclosed herein, such as the authentication server depicted in FIG. 1.

FIG. 10 illustrates a block diagram of an example network regulation server 1040 (such as one of the network regulation servers 140 or 240) that may be utilized in the local network 105. The network regulation server 1040 may include, for example, one more central processing units (CPUs) or processors 1052, and one or more busses or hubs 1053 that connect the processor(s) 1052 to other elements of the network regulation server 1040, such as a volatile memory 1054, a non-volatile memory 1055, a display controller 1056, and an I/O controller 1057. The volatile memory 1054 and the non-volatile memory 1055 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 1054 and/or the memory 1055 may store instructions 1058 that are executable by the processor 1052. For example, in an authentication server particularly configured to perform the bandwidth-optimization techniques described herein, the instructions may be the instructions executed by the network regulation server 140. In some embodiments, at least one of the memories 1054 and 1055 may additionally store an application reference table utilized to correlate header data to an application. Additionally, the bus 1053 may interconnect the network regulation server 1040 with a profile database (not depicted), such as the profile database 150, that stores a plurality of access profiles and usage profiles corresponding to a plurality of electronic device utilizing the local network.

The network regulation server 1040 may also include network interfaces 1077 controlled by the I/O control 1057. The network interfaces 1077 may be any number of antenna, transmitters, receivers, transceivers, etc. specifically configured to transmit or receive data at a particular frequency and/or frequency range. To this end, the instructions may include instructions that, when executed by the processors 1052, cause the network interfaces 1077 to transmit data over a local communication link and/or an external communication link. Similarly, when the network interfaces 1077 receives data, the instructions may include instructions that cause the processors 1052 to analyze and/or process the received data.

In some embodiments, the network regulation server 1040 may also perform any number of actions described herein with respect to an authentication server, such as the authentication server 120. In these embodiments, the instructions stored in the memories 1054 and 1055 may also include instructions to perform the actions described with respect to the authentication server. Accordingly, any reference to an authentication server being a distinct entity from a network regulation server is done for ease of explanation, and does not require the implementation of two distinct hardware modules.

The illustrated network regulation server 1040 is only one example of a network regulation server suitable to be particularly configured for use in the local network 105. Other embodiments of the network regulation server 1040 may also be particularly configured for use in the local network 105, even if the other embodiments have additional, fewer, or alternative components than shown in FIG. 10, have one or more combined components, or have a different configuration or arrangement of the components. Moreover, the various components shown in FIG. 10 can be implemented in hardware, a processor executing software instructions, or a combination of both hardware and a processor executing software instructions, including one or more signal processing and/or application specific integrated circuits.

Figure 11:
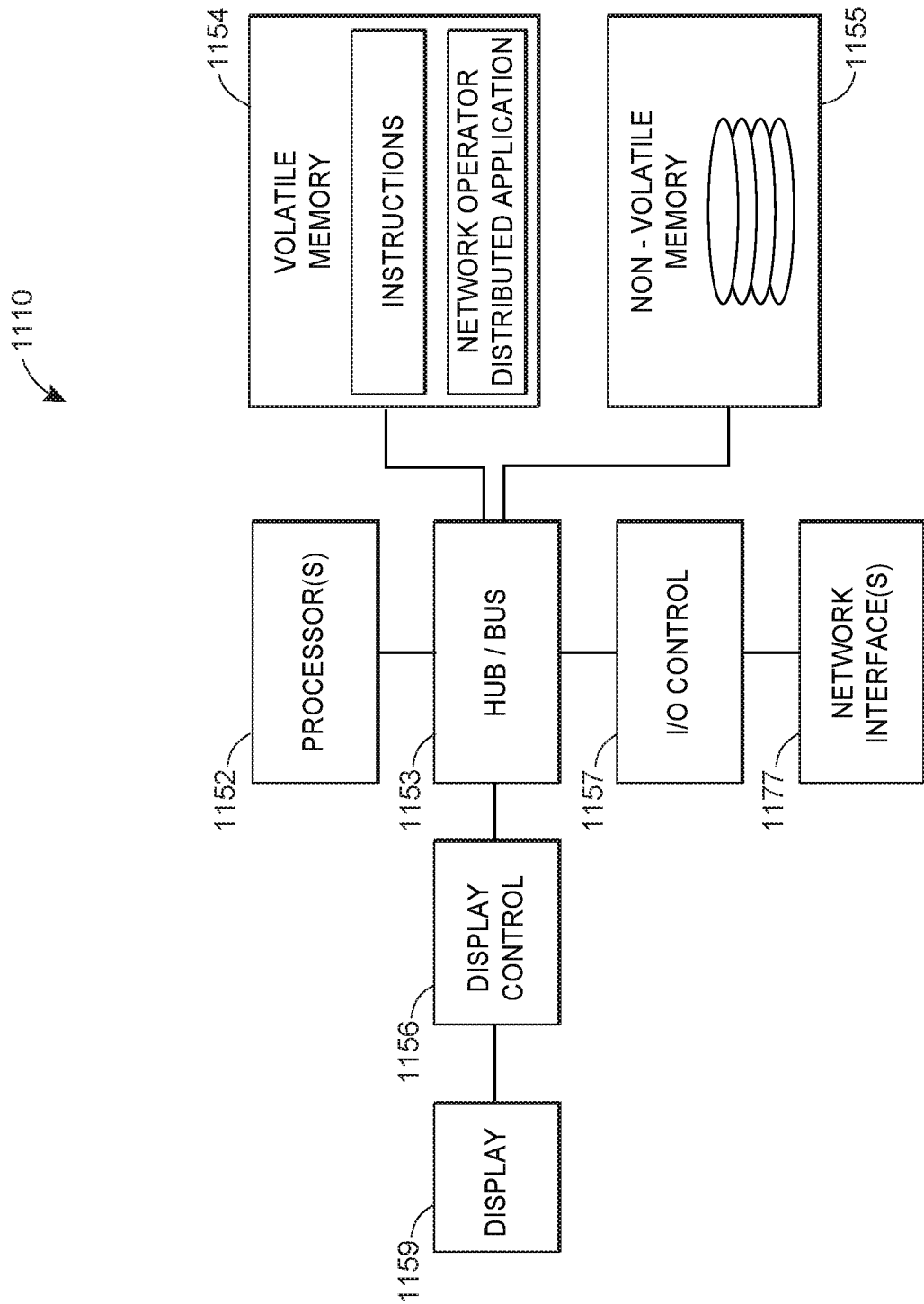
FIG. 11 is a block diagram of an electronic device that facilitates the bandwidth optimization techniques disclosed herein, such as one of the electronic devices depicted in FIG. 1.

FIG. 11 illustrates a block diagram of an electronic device 1110 (such as one of the electronic device 110 or 210) that may be utilized in the local network 105. The electronic device 1110 may include, for example, one more central processing units (CPUs) or processors 1152, and one or more busses or hubs 1153 that connect the processor(s) 1152 to other elements of the electronic device 1110, such as a volatile memory 1154, a non-volatile memory 1155, a display controller 1156, and an I/O controller 1157. The volatile memory 1154 and the non-volatile memory 1155 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 1154 and/or the memory 1155 may store instructions 1158 that are executable by the processor 1152. For example, in an electronic device particularly configured to perform the bandwidth-optimization techniques described herein, the instructions may be the instructions executed by the electronic device 1110. In some embodiments, the instructions may include instructions that, when executed by the processors 1152, cause at least one of the display control 1156 or the I/O control 1157 to present the user interfaces described above. In some embodiments, at least one of the memories 1054 and 1055 may additionally store a network operator distributed application. The network operator distributed application may include a set of instructions that enables the electronic device 1110 to receive push messages from the network operator as well as present some of the user interfaces described herein.

Additionally, the electronic device 1110 may include network interfaces 1177 controlled by the I/O control 1157. The network interfaces 1177 may be any number of antenna, transmitters, receivers, transceivers, etc. specifically configured to transmit or receive data at a particular frequency and/or frequency range. To this end, the instructions may include instructions that, when executed by the processors 1152, cause the network interfaces 1177 to transmit data over a local communication link. Similarly, when the network interfaces 1177 receives data via the local communication link, the instructions may include instructions that cause the processors 1152 to analyze and/or process the received data.

The illustrated electronic device 1110 is only one example of an electronic device suitable to be particularly configured for use in the local network 105. Other embodiments of the electronic device 1110 may also be particularly configured for use in the local network 105, even if the other embodiments have additional, fewer, or alternative components than shown in FIG. 11, have one or more combined components, or have a different configuration or arrangement of the components. Moreover, the various components shown in FIG. 11 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method for optimizing bandwidth usage, the method comprising receiving, from an electronic device, a plurality of data packets respectively addressed to a location external to a local network; identifying, by one or more processors, a plurality of communication sessions supported by the plurality of data packets; for each identified communication session, corresponding, by the one or more processors, the communication session to an application; querying, by the one or more process, an access profile assigned to the electronic device to determine a priority level for each application corresponding to a communication session, wherein the access profile is assigned to the electronic device based upon an indication of a user selection received from the electronic device, and associated with a prioritized list of applications; comparing, by the one or more processors, an amount of bandwidth required to transmit the plurality of data packets to a total bandwidth allocation indicated by the access profile; when the amount of bandwidth required to transmit the plurality of data packets is greater than a first threshold proportion of the total bandwidth allocation, routing a plurality of data packets associated with a first priority level to the respective locations external to the local network, and queuing a plurality of data packets associated with a second priority level, the second priority level being a lower priority than the first priority level; and when the amount of bandwidth required to transmit the plurality of data packets is less than the first threshold proportion of the total bandwidth allocation, routing the plurality of data packets associated with the first priority level and the plurality of data packets associated with the second priority level to the respective locations external to the local network.

2. The method of the previous aspect, further comprising receiving, from the electronic device, the indication of the access profile in response to a user interaction with an interface presented by the electronic device; and assigning, by the one or more processors, the access profile to an electronic record corresponding to the electronic device.

3. The method of any combination of the preceding aspects, wherein the electronic record corresponding to the electronic device includes a usage profile that indicates at least one of a byte volume of the plurality of data packets that were routed to the locations external to the local network or a byte volume of the plurality of data packets that was queued.

4. The method of any combination of the preceding aspects, wherein assigning the access profile to the electronic record corresponding to the electronic device further comprises storing, by the one or more processors, a default access profile within the electronic record; and updating, by the one or more processors, parameters associated with the default access profile to comply with the indicated access profile.

5. The method of any combination of the preceding aspects, further comprising determining, by the one or more processors, that the access profile indicates a set of applications that should be blocked; determining, by the one or more processors, that an application corresponding to one of the plurality of communication sessions is within the set of applications that should be blocked; and blocking, by the one or more processors, a plurality of data packets corresponding to the one of the plurality of communication sessions from reaching the respective location external the local network.

6. The method of any combination of the preceding aspects, further comprising utilizing, within the access profile, a plurality of application categories; and categorizing, by the one or more processors, an application within the prioritized list of applications as belonging to an application category within the plurality of application categories.

7. The method of any combination of the preceding aspects, wherein determining the priority level for each application corresponding to a communication session further comprises querying, by the one or more processors, the access profile corresponding to the electronic device to determine an application category to which the application belongs; and assigning, by the one or more processors, a priority level corresponding to the application category to the application.

8. The method of any combination of the preceding aspects, wherein subsequent to the amount of bandwidth required to transmit the plurality of data packets being greater than a first threshold proportion of the total bandwidth allocation determining, by the one or more processors, that the amount of bandwidth required to transmit the plurality of data packets is greater is below the first threshold proportion of the total bandwidth allocation; and routing, by the one or more processors, at least one of the queued data packets to the respective locations external to the local network.

9. The method of any combination of the preceding aspects, further comprising comparing, by the one or more processors, an amount of bandwidth required to transmit the plurality of data packets associated with the first priority level to the total bandwidth allocation indicated by access profile; determining, by the one or more processors, that the amount of bandwidth required to transmit the data packets associated with the first priority level is greater than a second threshold proportion of the total bandwidth allocation; routing, by the one or more processors, a portion of the plurality of data packets associated with the first priority level to the respective locations external to the local network; and queuing, by the one or more processors, another portion of the plurality of data packets associated with the first priority level.

10. A method for optimizing bandwidth usage via an application executing on an electronic device, wherein the electronic device includes one or more processors, and a memory coupled to the one or more processors, the method comprising the application causing the one or more processors to present an interface in the application executing on the electronic device, the interface for selection of an access product, the access product corresponding to an access profile that identifies a prioritized set of applications; receiving an input at the one or more processors, from the user via the application, indicating a selection of the access product; the application causing the one or more processors to transmit, via a local network, a notification including an indication of the selected access product; and the electronic device causing the one or more processors to transmit, via the local network, a plurality of data packets respectively addressed to locations external to a local network, each data packet being associated with an application, wherein when the byte volume of the plurality of data packets exceeds a threshold byte volume indicated by the access profile, data packets associated with applications that correspond to a higher priority level are transmitted to the respective locations external to the local network and applications data packets associated with applications that correspond to a lower priority level are queued.

11. The method of any combination of the preceding aspects, wherein the prioritized set of application associates individual applications to an application category, the application category corresponding to a priority level.

12. The method of any combination of the preceding aspects, wherein the interface presented on the electronic device comprises an interface generated by a captive portal.

13. The method of any combination of the preceding aspects, wherein the application causing the one or more processors to transmit the notification further comprises the application causing the one or more processors to transmit, via the local network, the notification, wherein the notification includes an indication of an identity of the electronic device.

14. The method of any combination of the preceding aspects, wherein the application causing the one or more processors to transmit the notification further comprises the application causing the one or more processors to transmit, via the local network, the notification, wherein the notification causes the access profile to be assigned to the electronic device.

15. A system for optimizing bandwidth usage, the system comprising one or more processors; a profile database storing an access profile corresponding to an electronic device; and one or more non-transitory, computer-readable storage media storing computer-executable instructions that, when executed by the one or more processors, cause the system to receive, from the electronic device, a traffic addressed to a location external to a local network; identify, by the one or more processors, a plurality of data streams within the traffic; respectively correspond, by the one or more processors, the plurality of data stream to a plurality of applications; query, by the one or more process, the access profile corresponding to the electronic device to determine a priority level for the plurality of applications, wherein the access profile is assigned to the electronic device based upon an indication of a user selection received from the electronic device, and associated with a prioritized list of applications; compare, by the one or more processors, an amount of bandwidth required to transmit the traffic to a total bandwidth allocation indicated by the access profile; when the amount of bandwidth required to transmit the traffic is greater than a threshold proportion of the total bandwidth allocation, route the data streams corresponding to applications associated with a first priority level to the respective locations external to the local network, and queue data streams corresponding to application associated with a second priority level, the second priority level being a lower priority than the first priority level; and when the amount of bandwidth required to transmit the traffic is less than the threshold proportion of the total bandwidth allocation, route the data streams corresponding to applications associated with the first priority level and the data streams corresponding to application associated with the second priority level to the respective locations external to the local network.

16. The system of the preceding aspect, wherein the computer-executable instructions, when executed by the one or more processors, further cause the system to receive, from the electronic device, the indication of the access profile in response to a user interaction with an interface presented by the electronic device; and assign, by the one or more processors, the access profile to an electronic record within the profile database corresponding to the electronic device.

17. The system of any combination of aspects 15-16, wherein the electronic record corresponding to the electronic device includes a usage profile that indicates at least one of a byte volume of the plurality of data packets that were routed to the locations external to the local network or a byte volume of the plurality of data packets that was queued.

18. The system of any combination of aspects 15-17, wherein the electronic record electronic record corresponding to the electronic device categorizes the prioritized list of applications into a plurality of application categories.

19. The system of any combination of aspects 15-18, wherein to determine the priority level for each application, the computer-executable instructions, when executed by the one or more processors, further cause the system to query, by the one or more processors, the access profile corresponding to the electronic device to determine an application category to which the application belongs; and assign, by the one or more processors, a priority level corresponding to the application category to the application.

20. The system of any combination of aspects 15-19, wherein to identify the plurality of data streams within the traffic, the computer-executable instructions, when executed by the one or more processors, further cause the system to analyze, by the one or more processors, header data of individual data packets within the traffic; and identify, by the one or more processors, the plurality of data streams based upon the header data.

What is claimed is:

1. A method for optimizing bandwidth usage, the method comprising:
    identifying, by one or more processors, a plurality of communication sessions associated with an electronic device;
    corresponding, by the one or more processors, the communication sessions to respective applications;
    querying, by the one or more processors, an access profile assigned to the electronic device to determine a priority level for the applications corresponding to the communication sessions, wherein the access profile associates the applications with respective priority levels;
    comparing, by the one or more processors, an amount of bandwidth required for the plurality of communication sessions to a total bandwidth allocation indicated by the access profile;
    when the amount of bandwidth required for the plurality of communication sessions is greater than a first threshold proportion of the total bandwidth allocation,
        routing data packets that form communication sessions associated with a first priority level to the respective locations external to the local network, and
        queuing data packets that form communication sessions associated with a second priority level, the second priority level being a lower priority than the first priority level; and
    when the amount of bandwidth required for the plurality of communication sessions is less than the first threshold proportion of the total bandwidth allocation,
        routing data packets that form communication sessions associated with the first priority level and data packets that form communication sessions associated with the second priority level to the respective locations external to the local network.

2. The method of claim 1, further comprising:
receiving, from the electronic device, the indication of the access profile in response to a user interaction with an interface presented by the electronic device; and
assigning, by the one or more processors, the access profile to an electronic record corresponding to the electronic device.

3. The method of claim 2, wherein the electronic record corresponding to the electronic device includes a usage profile that indicates at least one of a byte volume of the plurality of data packets that were routed to the locations external to the local network or a byte volume of the plurality of data packets that was queued.

4. The method of claim 2, wherein assigning the access profile to the electronic record corresponding to the electronic device further comprises:
storing, by the one or more processors, a default access profile within the electronic record; and
updating, by the one or more processors, parameters associated with the default access profile to comply with the indicated access profile.

5. The method of claim 1, further comprising:
determining, by the one or more processors, that the access profile indicates a set of applications that should be blocked;
determining, by the one or more processors, that an application corresponding to one of the plurality of communication sessions is within the set of applications that should be blocked; and
blocking, by the one or more processors, data packets corresponding to the one of the plurality of communication sessions from reaching the respective location external the local network.

6. The method of claim 1, further comprising:
utilizing, within the access profile, a plurality of application categories; and
categorizing, by the one or more processors, an application within the prioritized list of applications as belonging to an application category within the plurality of application categories.

7. The method of claim 6, wherein determining the priority level for each application corresponding to a communication session further comprises:
querying, by the one or more processors, the access profile corresponding to the electronic device to determine an application category to which the application belongs; and
assigning, by the one or more processors, a priority level corresponding to the application category to the application.

8. The method of claim 1, wherein subsequent to the amount of bandwidth required for the plurality of communication sessions being greater than a first threshold proportion of the total bandwidth allocation:
determining, by the one or more processors, that the amount of bandwidth required for the plurality of communication sessions is below the first threshold proportion of the total bandwidth allocation; and
routing, by the one or more processors, at least one of the queued data packets to the respective locations external to the local network.

9. The method of claim 1, further comprising:
comparing, by the one or more processors, an amount of bandwidth required for the plurality of communication sessions associated with the first priority level to the total bandwidth allocation indicated by access profile;
determining, by the one or more processors, that the amount of bandwidth required for the plurality of communication sessions associated with the first priority level is greater than a second threshold proportion of the total bandwidth allocation;
routing, by the one or more processors, a portion of the data packets that form communication sessions associated with the first priority level to the respective locations external to the local network; and
queuing, by the one or more processors, another portion of the data packets that form communication sessions associated with the first priority level.

10. A method for optimizing bandwidth usage via an application executing on an electronic device, wherein the electronic device includes one or more processors, and a memory coupled to the one or more processors, the method comprising:
the application causing the one or more processors to present an interface in the application executing on the electronic device, the interface for selection of an access product, the access product corresponding to an access profile that identifies a set of applications and corresponding network priority levels thereof;
receiving an input at the one or more processors, from the user via the application, indicating a selection of the access product;
the application causing the one or more processors to transmit, via a local network, a notification including an indication of the selected access product; and
the electronic device causing the one or more processors to transmit, via the local network, a plurality of data packets respectively addressed to locations external to a local network and associated with an application in the set of applications,
wherein:
when the byte volume of the plurality of data packets exceeds a threshold proportion of a total bandwidth allocation indicated by the access profile, data packets associated with applications in the set of applications that correspond to a higher priority level are transmitted to the respective locations external to the local network and data packets associated with applications in the set of applications that correspond to a lower priority level are queued, and
when the byte volume of the plurality of data packets is less than the threshold proportion of a total bandwidth allocation indicated by the access profile, data packets associated with applications in the set of applications that correspond to a higher priority level and data packets associated with applications in the set of applications that correspond to a lower priority level are routed to the respective locations external to the local network.

11. The method of claim 10, wherein the set of applications associates individual applications to an application category, the application category corresponding to the network priority level.

12. The method of claim 10, wherein the interface presented on the electronic device comprises an interface generated by a captive portal.

13. The method of claim 10, wherein the application causing the one or more processors to transmit the notification further comprises:
the application causing the one or more processors to transmit, via the local network, the notification, wherein the notification includes an indication of an identity of the electronic device.

14. The method of claim 10, wherein the application causing the one or more processors to transmit the notification further comprises:
the application causing the one or more processors to transmit, via the local network, the notification, wherein the notification causes the access profile to be assigned to the electronic device.

15. A system for optimizing bandwidth usage, the system comprising:
one or more processors;
a profile database storing an access profile corresponding to an electronic device; and
one or more non-transitory, computer-readable storage media storing computer-executable instructions that, when executed by the one or more processors, cause the system to:
receive, from the electronic device, a traffic addressed to a location external to a local network;
identify, by the one or more processors, a plurality of data streams within the traffic;
correspond, by the one or more processors, the data streams to respective applications;
query, by the one or more process, the access profile corresponding to the electronic device to determine a network priority level for the plurality of applications, wherein the access profile associates applications with a respect network priority level;
compare, by the one or more processors, an amount of bandwidth required to transmit the traffic to a total bandwidth allocation indicated by the access profile;
when the amount of bandwidth required to transmit the traffic is greater than a threshold proportion of the total bandwidth allocation,
route the data streams corresponding to applications associated with a first network priority level to the respective locations external to the local network, and
queue data streams corresponding to application associated with a second network priority level, the second network priority level being a lower priority than the first network priority level; and
when the amount of bandwidth required to transmit the traffic is less than the threshold proportion of the total bandwidth allocation,
route the data streams corresponding to applications associated with the first network priority level and the data streams corresponding to applications associated with the second network priority level to the respective locations external to the local network.

16. The system of claim 15, wherein the computer-executable instructions, when executed by the one or more processors, further cause the system to:
receive, from the electronic device, the indication of the access profile in response to a user interaction with an interface presented by the electronic device; and
assign, by the one or more processors, the access profile to an electronic record within the profile database corresponding to the electronic device.

17. The system of claim 16, wherein the electronic record corresponding to the electronic device includes a usage profile that indicates at least one of a byte volume of the plurality of data packets that were routed to the locations external to the local network or a byte volume of the plurality of data packets that was queued.

18. The system of claim 16, wherein the electronic record electronic record corresponding to the electronic device categorizes the applications into a plurality of application categories.

19. The system of claim 16, wherein to determine the network priority level a particular application, the computer-executable instructions, when executed by the one or more processors, further cause the system to:
query, by the one or more processors, the access profile corresponding to the electronic device to determine an application category to which the particular application belongs; and
assign, by the one or more processors, a network priority level corresponding to the application category to the particular application.

20. The system of claim 15, wherein to identify the plurality of data streams within the traffic, the computer-executable instructions, when executed by the one or more processors, further cause the system to:analyze, by the one or more processors, header data of individual data packets within the traffic; and identify, by the one or more processors, the plurality of data streams based upon the header data.

* * * * *